(12) United States Patent
Gu et al.

(10) Patent No.: US 12,242,416 B2
(45) Date of Patent: Mar. 4, 2025

(54) SYSTOLIC NEURAL CPU PROCESSOR

(71) Applicant: Northwestern University, Evanston, IL (US)

(72) Inventors: Jie Gu, Evanston, IL (US); Yuhao Ju, Evanston, IL (US)

(73) Assignee: Northwestern University, Evanston, IL (US)

( * ) Notice: Subject to any disclaimer, the term of this patent is extended or adjusted under 35 U.S.C. 154(b) by 251 days.

(21) Appl. No.: 18/146,048

(22) Filed: Dec. 23, 2022

(65) Prior Publication Data

US 2023/0205729 A1  Jun. 29, 2023

Related U.S. Application Data

(60) Provisional application No. 63/294,193, filed on Dec. 28, 2021.

(51) Int. Cl.
*G06F 15/80* (2006.01)
*G06F 9/50* (2006.01)

(52) U.S. Cl.
CPC ........ *G06F 15/8046* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 11,227,030 B2 * | 1/2022 | Simpson | ................. | G06F 17/16 |
| 11,288,076 B2 * | 3/2022 | Wang | ............... | H03K 19/17724 |
| 11,663,016 B2 * | 5/2023 | Wang | ................. | G06F 13/4068 |
| | | | | 708/603 |
| 2020/0293867 A1 * | 9/2020 | Shao | .................... | G06F 9/30036 |
| 2020/0311183 A1 * | 10/2020 | Simpson | ................. | G06F 17/16 |
| 2021/0081211 A1 * | 3/2021 | Wang | .................... | G06F 9/3893 |
| 2021/0200711 A1 * | 7/2021 | Pillai | ...................... | G06N 3/063 |
| 2022/0057994 A1 * | 2/2022 | Ware | ...................... | G06F 7/5443 |
| 2022/0214888 A1 * | 7/2022 | Wang | ............... | H03K 19/17724 |

(Continued)

OTHER PUBLICATIONS

Machine Translation of Japanese Patent Application JP 2010041429 A, 2010. (Year: 2010).*

(Continued)

*Primary Examiner* — Steven G Snyder
(74) *Attorney, Agent, or Firm* — Benesch Friedlander Coplan & Aronoff LLP

(57) ABSTRACT

A systolic neural CPU (SNCPU) including a two-dimensional systolic array of reconfigurable processing elements (PE's) fuses a conventional CPU with a convolutional neural network (CNN) accelerator in four phases of operation: row-CPU, column-accelerator, column-CPU, and row-accelerator. The SNCPU cycles through the four phases to avoid costly data movement across cores, reduce overhead, and reduce latency. The PE's communicate bidirectionally with neighboring PE's and memory units at an outer edge of the array. A row of PE's is configurable into a first deep neural network (DNN) accumulator at a first time and configurable into a first CPU pipeline at a second time. A column of PE's is configurable into a second DNN accumulator at a third time and configurable into a second CPU pipeline at a fourth time.

20 Claims, 40 Drawing Sheets

(56) References Cited

U.S. PATENT DOCUMENTS

2024/0004830 A1\* 1/2024 Zhang ................ G06F 15/8046
2024/0103810 A1\* 3/2024 Chen ........................ G06F 7/57

OTHER PUBLICATIONS

Machine Translation of Japanese Patent Application JP 2004536373 A, 2004. (Year: 2004).\*

'A Customizable Matrix Multiplication Framework for the Intel HARPv2 Xeon+FPGA Platform—A Deep Learning Case Study' by Duncan J.M. Moss et al, copyright 2018. (Year: 2018).\*

'ArrayFlex: A Systolic Array Architecture with Configurable Transparent Pipelining' by C. Peltekis et al., 2023. (Year: 2023).\*

Jouppi, Norman P. et al., "In-Datacenter Performance Analysis of a Tensor Processing Unit," ACM/IEEE ISCA, Jun. 24-28, 2017, 12 pages.

Karnik, Tanay et al., "A cm-Scale Self-Powered Intelligent and Secure IoT Edge Mote Featuring an Ultra-Low-Power SoC in 14nm Tri-Gate CMOS," IEEE International Solid-State Circuits Conference—(ISSCC), 2018, 3 pages.

Xi, Sam (Likun) et al., "SMAUG: End-to-End Full-Stack Simulation Infrastructure for Deep Learning Workloads," ACM Transactions on Architecture and Code Optimization, vol. 17, No. 4, Article 39, Nov. 2020, 26 pages.

Genc, Hasan et al., "Gemmini: Enabling Systematic Deep-Learning Architecture Evaluation via Full-Stack Integration," ACM/IEEE, 2021, 6 pages.

Whatmough, Paul N. et al., "A 16nm 25mm2 SoC with a 54.5x Flexibility-Efficiency Range from Dual-Core Arm Cortex-A53 to eFPGA and Cache-Coherent Accelerators," IEEE Symposium on VLSI Circuits Digest of Technical Papers, Jun. 2019, 2 pages.

Jia, Tianyu et al., "NCPU: An Embedded Neural CPU Architecture on Resource-Constrained Low Power Devices for Real-time End-to-End Performance," 53rd Annual IEEE/ACM International Symposium on Microarchitecture (MICRO), 2020, 13 pages.

\* cited by examiner

|  | MiCRO2020[6] | Eyeriss | DNPU | This Work |
|---|---|---|---|---|
| Process | 65nm | 65nm | 65nm | 65nm |
| Area (mm²) | 2.86 | 12.25 | 16 | 4.47 |
| Architecture | CPU+BNN | CNN | CNN,FC,LSTM | CPU+CNN |
| Dataset | MNIST Ninapro | Imagenet | - | CIFAR10 Imagenet |
| NN Model | FC | AlexNet | - | VGG16 ResNet18 |
| Power | 241mW | 278mW | 279mW | 116mW(CNN) |
| Bit Precision | INT1 | INT16 | INT16 | INT8 |
| Frequency | 960MHz | 250MHz | 200MHz | 400MHz |
| Norm. Supply Vdd | 1.0V | 1.0V | 1.1V | 1.0V |
| SRAM | 55.5KB | 181KB | 290KB | 150KB |
| Efficiency (TOPS/W) | 1.6(1V, 1b) | 0.241(1V, 16b) | 1.0(1.1V, 16b) | 0.66 (1V, 8b) |

FIG. 14

SYSTOLIC NEURAL CPU PROCESSOR

CROSS-REFERENCE TO RELATED APPLICATIONS

The present application claims the benefit of priority under 35 U.S.C. § 119 from U.S. Provisional Application Ser. No. 63/294,193 entitled "Systolic Neural CPU Processor," filed on Dec. 28, 2021, all of which is incorporated herein by reference in its entirety for all purposes.

STATEMENT OF FEDERALLY FUNDED RESEARCH OR SPONSORSHIP

This invention was made with government support under grant number CCF-2008906 awarded by the National Science Foundation. The government has certain rights in the invention.

TECHNICAL FIELD

The present disclosure generally relates to neural network accelerators, and more specifically relates to systolic neural CPU processors.

BACKGROUND

There has been progress reported in the fields of machine learning and deep neural networks (DNNs), specifically related to building efficient DNN accelerators. However, few reported works have targeted improving end-to-end performance of deep learning tasks, where inter-layer pre/post-processing, data alignment, and data movement across memory and processing units often dominate the execution time. Some prior works have considered data compression, reduction of data movement, or improvement of memory bandwidth. For example, an accelerator coherency port (ACP) was designed to request data directly from a last level cache of a central processing unit (CPU) instead of using a direct memory access (DMA) engine to improve the efficiency of data transfer.

SUMMARY

An exemplary electronic circuit includes a two-dimensional systolic array of reconfigurable processing elements that are configured to communicate bidirectionally with neighboring reconfigurable processing elements. Memory units are configured to communicate bidirectionally with corresponding reconfigurable processing units at an outer edge of the two-dimensional systolic array. Accumulator modules are configured to communicate with at least one reconfigurable processing element and memory unit of a row or column of the two-dimensional systolic array. Instruction caches at an edge of a row or a column of the two-dimensional systolic array are configured to communicate with corresponding reconfigurable processing elements. A row of the two-dimensional systolic array of reconfigurable processing elements is configurable into a first deep neural network (DNN) accumulator at a first time and configurable into a first CPU pipeline at a second time. A column of the two-dimensional systolic array of reconfigurable processing elements is configurable into a second deep neural network (DNN) accumulator at a third time and configurable into a second CPU pipeline at a fourth time.

In an example, the first CPU pipeline and the second CPU pipeline may each include a first reconfigurable processing element configured into a program counter (PC) register, a second and a third reconfigurable processing element configured together into an instruction fetch (IF) stage, a fourth and a fifth reconfigurable processing element each configured into a different instruction decoder for an instruction decoding (ID) stage, a sixth reconfigurable processing element configured into an arithmetic logic unit (ALU) of an execution (EX) stage, a seventh reconfigurable processing element configured into a branch unit of the EX stage, an eighth reconfigurable processing element configured into Boolean logic for functions of the ALU of the EX stage, a ninth reconfigurable processing element configured into a memory register (MEM) stage, and a tenth reconfigurable processing element configured into a write-back (WB) stage. The first CPU pipeline and the second CPU pipeline may each further include a register file (RF) configured to receive data from the reconfigurable processing elements of the ID stage and the WB stage, and to send data to the EX stage. The first CPU pipeline and the second CPU pipeline may each be configured as a RISC-V CPU pipeline.

In an example, the electronic circuit may also include a row level-two memory unit in bidirectional communications with a first subset of the memory units at one end of the rows of the two-dimensional systolic array of reconfigurable processing elements. The electronic circuit may also include a column level-two memory unit in bidirectional communications with a second subset of the memory units at one end of the columns of the two-dimensional systolic array of reconfigurable processing elements.

In an example, the electronic circuit may also include register files in bidirectional communications with at least one of the reconfigurable processing elements of a corresponding row or column of the two-dimensional systolic array.

In an example, the accumulator modules may be configured to provide, when their respective row or column of the two-dimensional systolic array of reconfigurable processing elements is configured as a DNN accumulator, single instruction, multiple data (SIMD) support for pooling, rectified linear unit (ReLU) functionality, and/or accumulation.

In an example, the two-dimensional systolic array of reconfigurable processing elements may include ten reconfigurable processing elements in each dimension.

In an example, the two-dimensional systolic array of reconfigurable processing elements may be reconfigurable into four modes. A first of these modes may be a row-CPU mode wherein each row of the two-dimensional systolic array includes a RISC-V pipeline core that processes data from a left column toward a rightmost column of the two-dimensional systolic array and stores results in memory elements on the right side of the rows of the two-dimensional systolic array. A second of these modes may be a column-accelerator mode wherein data flows from memory elements on a right side of the rows leftward toward a leftmost column of the two-dimensional systolic array in an activation process and data accumulates downward toward memory elements on a bottom side of the columns in an accumulation process. A third of these modes may be a column-CPU mode wherein each column of the two-dimensional systolic array includes a RISC-V pipeline core that processes data from a top row toward a bottom row of the two-dimensional systolic array and stores results in memory elements on the bottom side of the columns of the two-dimensional systolic array. A fourth of these modes may be a row-accelerator mode wherein data flows from memory elements on a bottom side of the columns upward toward a topmost row of the two-dimensional systolic array in an activation process and data accumulates rightward toward memory elements on a right side of the rows in an accumulation process.

In an example, a control circuit may be configured to cause the electronic circuit to cycle through the row-CPU mode, the column-accelerator mode, the column-CPU mode, and the row-accelerator mode continuously until all neural network layers of the electronic circuit have finished eliminating intermediate data transfer across the processing elements.

An exemplary method of performing deep neural network processing and computing processing may be executed in a two-dimensional systolic array of reconfigurable processing elements, in which the reconfigurable processing elements communicate bidirectionally with neighboring reconfigurable processing elements. The exemplary method includes configuring the two-dimensional systolic array of reconfigurable processing elements into a row-CPU mode in which standard computations are performed on input data by the two-dimensional systolic array. The exemplary method also includes receiving input data by the two-dimensional systolic array configured in row-CPU mode and performing standard computations on the input data by the two-dimensional systolic array. Results of the row-CPU computations are stored in memory elements local to the two-dimensional systolic array. The exemplary method further includes configuring the two-dimensional systolic array of reconfigurable processing elements into a column-accelerator mode in which the two-dimensional systolic array is configured to perform deep neural network processing on input data. The exemplary method also includes performing column-accelerator mode neural network computations starting from the results from the row-CPU mode computations in the local memory elements where the results were saved as input data, by the two-dimensional systolic array configured into column-accelerator mode. The exemplary method also includes saving results of the column-accelerator mode neural network computations in memory elements local to the two-dimensional systolic array. The exemplary method further includes configuring the two-dimensional systolic array of reconfigurable processing elements into a column-CPU mode in which the two-dimensional systolic array is configured to perform standard computations on input data. The exemplary method additionally includes receiving input data by the two-dimensional systolic array configured into column-CPU mode and performing standard computations on the input data by the two-dimensional systolic array. The exemplary method also includes saving results of the column-CPU computations in memory elements local to the two-dimensional systolic array. The exemplary method further includes configuring the two-dimensional systolic array of reconfigurable processing elements into a row-accelerator mode in which the two-dimensional systolic array is configured to perform deep neural network processing on input data. The exemplary method also includes performing row-accelerator mode neural network computations starting from the results from the column-CPU mode computations in the local memory elements where the results were saved as input data, by the two-dimensional systolic array configured into row-accelerator mode. The exemplary method also includes saving results of the row-accelerator mode neural network computations in memory elements local to the two-dimensional systolic array.

In an example, the exemplary method may further include determining if any neural network layers of the two-dimensional systolic array have any intermediate data transfer across cores remaining to be eliminated, and while intermediate data transfer across cores remains to be eliminated, continuing cycling through operations of the exemplary method in a circular sequence from row-CPU mode operations, to column-accelerator mode operations, to column-CPU mode operations, and to row-accelerator mode operations.

In an example, data may be caused to flow in a direction during the row-accelerator mode neural network computations that is orthogonal to a direction data flows during the column-accelerator mode neural network computations.

In an example, performing neural network computations may include performing systolic dataflow with weight-stationary operations, and performing standard computations by the two-dimensional systolic array may include performing computations by a sequence of RISC-V pipeline stages configured from the processing elements of the two-dimensional systolic array.

An exemplary method of performing deep neural network processing and computing processing may be executed in a two-dimensional systolic array of reconfigurable processing elements, in which the reconfigurable processing elements bidirectionally communicate with neighboring reconfigurable processing elements. The exemplary method includes configuring the two-dimensional systolic array of reconfigurable processing elements into a row-CPU mode in which each row of the two-dimensional systolic array includes a RISC-V pipeline core, and performing computing processing of each RISC-V pipeline core row from a leftmost column toward a rightmost column of the two-dimensional systolic array. The exemplary method also includes storing results of the RISC-V pipeline core row processing in memory elements to the right of the rightmost column of the two-dimensional systolic array. The exemplary method further includes configuring the two-dimensional systolic array of reconfigurable processing elements into a column-accelerator mode in which the reconfigurable processing elements are configured as DNN processing elements, and performing column-accelerator mode activation by processing neural network data flowing from the memory elements on the rightmost side of the rows of the two-dimensional systolic array leftward toward a leftmost column of the two-dimensional systolic array. The exemplary method also includes performing column-accelerator mode accumulation by processing neural network data flowing from the topmost row of the two-dimensional systolic array toward memory elements below the bottommost row of the two-dimensional systolic array. The exemplary method also includes storing results of the column-accelerator mode accumulation in memory elements below the bottommost row of the two-dimensional systolic array. The exemplary method further includes configuring the two-dimensional systolic array of reconfigurable processing elements into a column-CPU mode in which each column of the two-dimensional systolic array includes a RISC-V pipeline core, and performing computing processing of each RISC-V pipeline core column from a topmost row toward a bottommost row of the two-dimensional systolic array. The exemplary method also includes storing results of the RISC-V pipeline core column processing in memory elements below the bottommost row of the two-dimensional systolic array, and configuring the two-dimensional systolic array of reconfigurable processing elements into a row-accelerator mode wherein the reconfigurable processing elements are configured as DNN processing elements. The exemplary method further includes performing row-accelerator mode activation by processing neural network data flowing from the memory elements below the bottommost row of the two-dimensional systolic array upward toward a topmost row of the two-dimensional systolic array, and performing row-accelerator mode accumulation by processing neural network data flowing from the leftmost column of the two-dimensional systolic array toward the memory elements to the right of the rightmost column of the two-dimensional systolic array. The exemplary method additionally includes storing results of the row-accelerator mode accumulation in the memory elements to the right of the rightmost column of the two-dimensional systolic array.

In an example, the exemplary method may further include sending data stored in the memory elements at a conclusion of a most recently completed row-accelerator mode accumulation process to corresponding register files of the respective RISC-V pipeline core rows and processing the sent data provided to the execution stage of the RISC-V pipeline core rows by the corresponding register files.

In an example, the exemplary method may further include sending data stored in the memory elements at a conclusion of a most recently completed column-accelerator mode accumulation process to corresponding register files of the respective RISC-V pipeline core columns and processing the sent data provided to the execution stage of the RISC-V pipeline core columns by the corresponding register files.

In an example, the exemplary method may further include using data stored in the memory elements at a conclusion of a most recently completed column-CPU mode computing process as input data to the respective row-accelerator mode columns.

In an example, the exemplary method may further include using data stored in the memory elements at a conclusion of a most recently completed row-CPU mode computing process as input data to the respective column-accelerator mode rows.

In an example, the exemplary method may further include determining if any neural network layers of the two-dimensional systolic array have any intermediate data transfer across cores remaining to be eliminated, and while intermediate data transfer across cores remains to be eliminated, continuing cycling through operations of the exemplary method in a circular sequence from row-CPU mode operations, to column-accelerator mode operations, to column-CPU mode operations, and to row-accelerator mode operations.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 14 is a table that shows a comparison of the exemplary SNCPU test chip shown in FIG. 12 with prior works.

DETAILED DESCRIPTION

Figure 1:
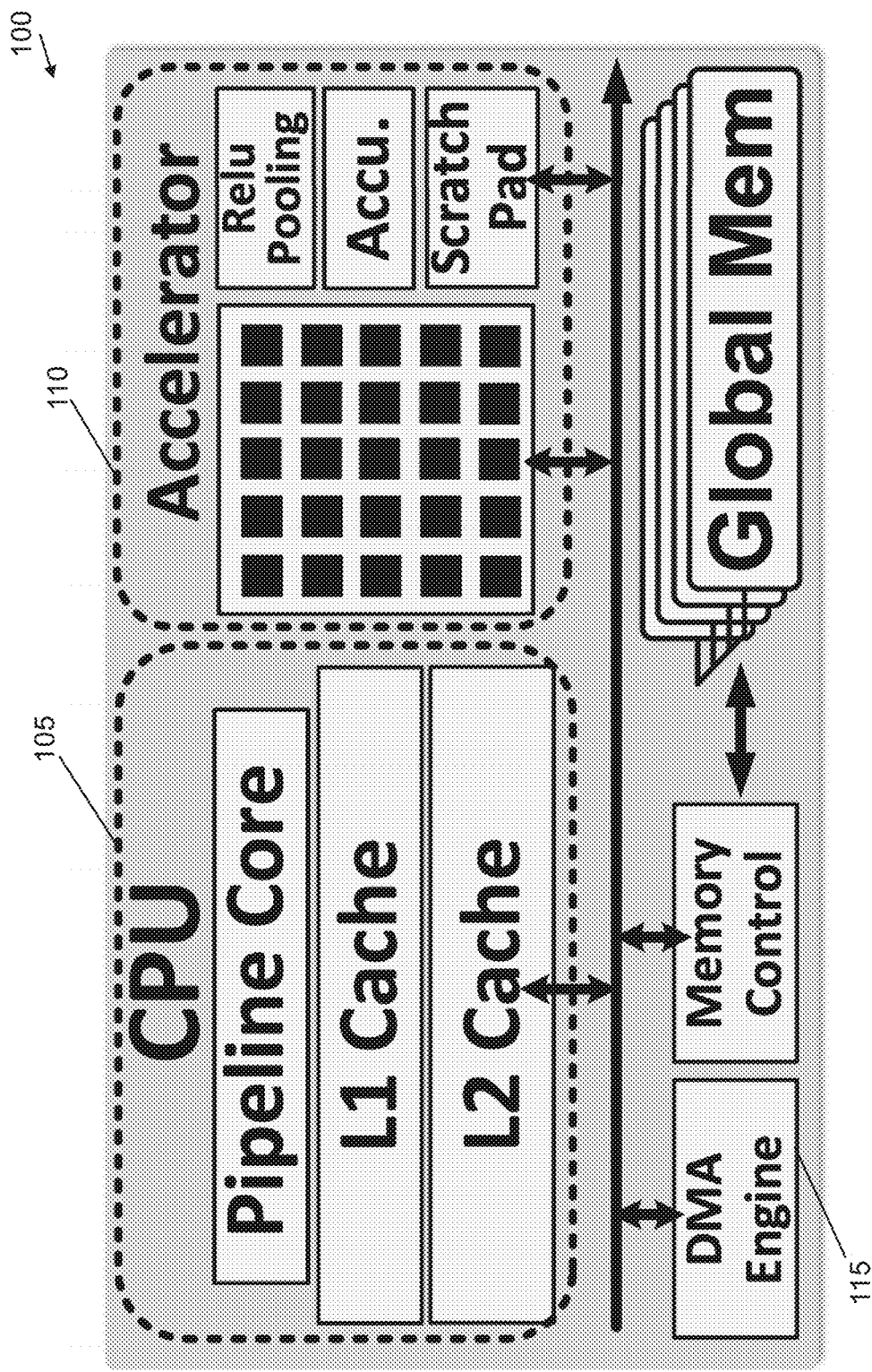
FIG. 1 is a schematic diagram that illustrates an exemplary heterogeneous architecture for combined deep learning and general purpose computing.

FIG. 1 is a schematic diagram that illustrates an exemplary heterogeneous architecture 100 for combined deep learning and general purpose computing. The architecture 100 includes a central processing unit (CPU) core 105 and an accelerator 110 with data communication managed by a direct memory access (DMA) engine 115. However, there remain the challenges of low utilization of processing element (PE) cores and large latency due to the CPU workload and data movement across processing cores. For example, in an end-to-end deep learning task, the accelerator 110 may often be utilized at only approximately 30-50% with the rest of time waiting for CPU processing and data movement between the CPU 105 and accelerator 110 cores.

Figure 2:
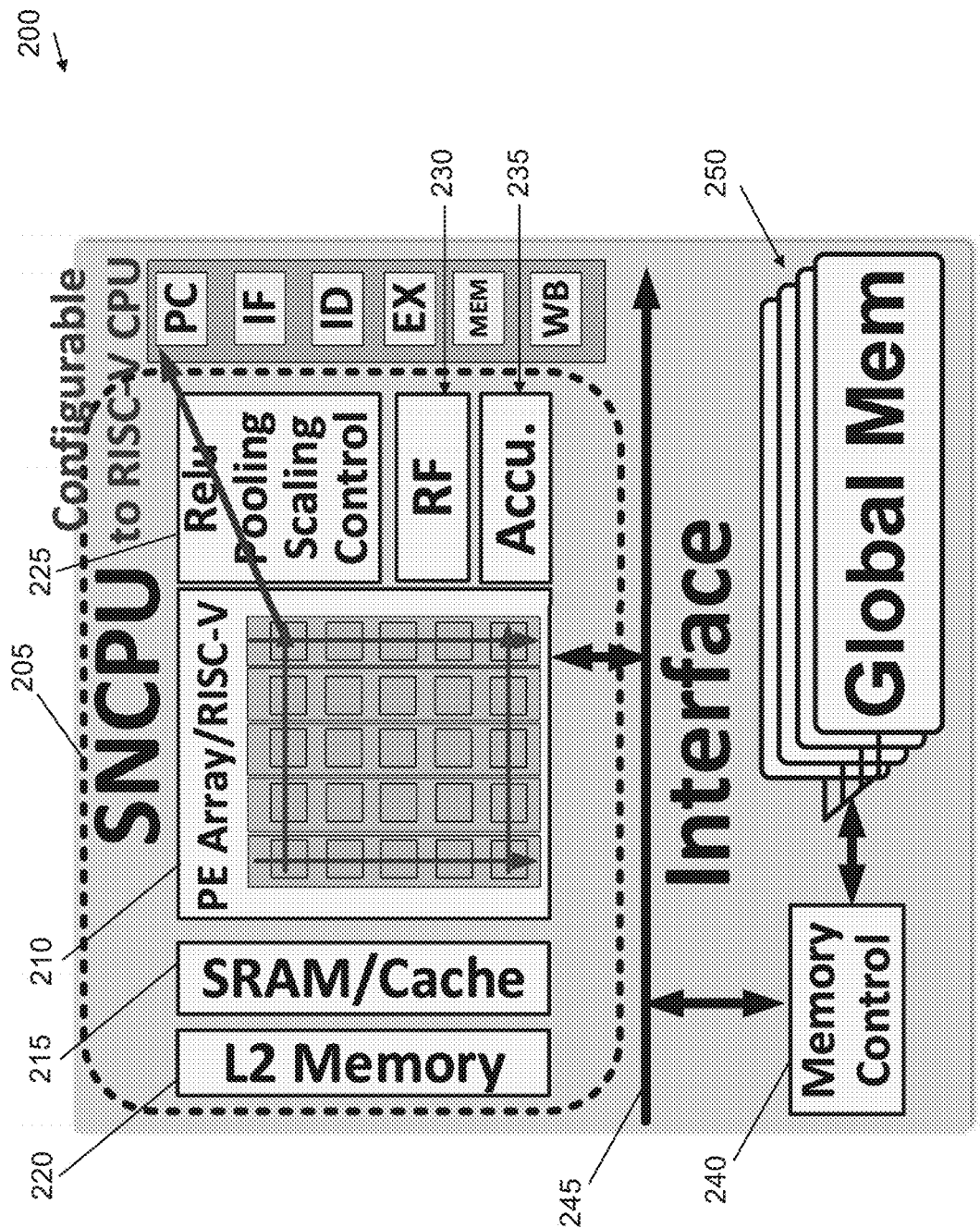
FIG. 2 is a schematic diagram that illustrates an architecture of an exemplary systolic neural CPU (SNCPU).

FIG. 2 is a schematic diagram that illustrates an architecture of an exemplary systolic neural CPU (SNCPU) 200. The SNCPU 200 may fuse operations of a conventional CPU (e.g., CPU 105) and a systolic convolutional neural network (CNN) accelerator (e.g., accelerator 110) in a single SNCPU core 205. The SNCPU core 205 may include a RISC-V PE array 210, an SRAM cache 215, a level 2 memory (L2) 220, a rectified linear unit (ReLU) pooling scaling control 225, a register file (RF) unit 230, and an accumulator 235. A memory control unit 240 may control data transfers via an interface or data bus 245 between the SNCPU core 205 and one or more global memory units 250.

Benefits of the SNCPU 200 may include, but are not limited to, the following:
1) the architecture of the SNCPU 200 may be flexibly reconfigured into a multi-core RISC-V CPU (e.g., a CPU based on an instruction set architecture (ISA) rooted in reduced instruction set computer (RISC) principles) or a systolic CNN accelerator, leading to PE utilization of over 95% for end-to-end operation;
2) with an overhead of less than 10%, the CNN accelerator may be reconfigured into a 10-core RISC-V CPU to improve throughput significantly compared with a conventional heterogeneous architecture having a CPU and an accelerator;
3) with a special bi-directional dataflow, expensive data movement for inter-layer pre/post-processing across cores may be avoided; and
4) experimental demonstrations of the SNCPU 200 through a 65 nm test chip show 39% to 64% latency improvement and 0.65 to 1.8 tera-operations-per-second-per-Watt (TOPS/W) energy efficiency on end-to-end image-classification tasks.

Figure 3A:
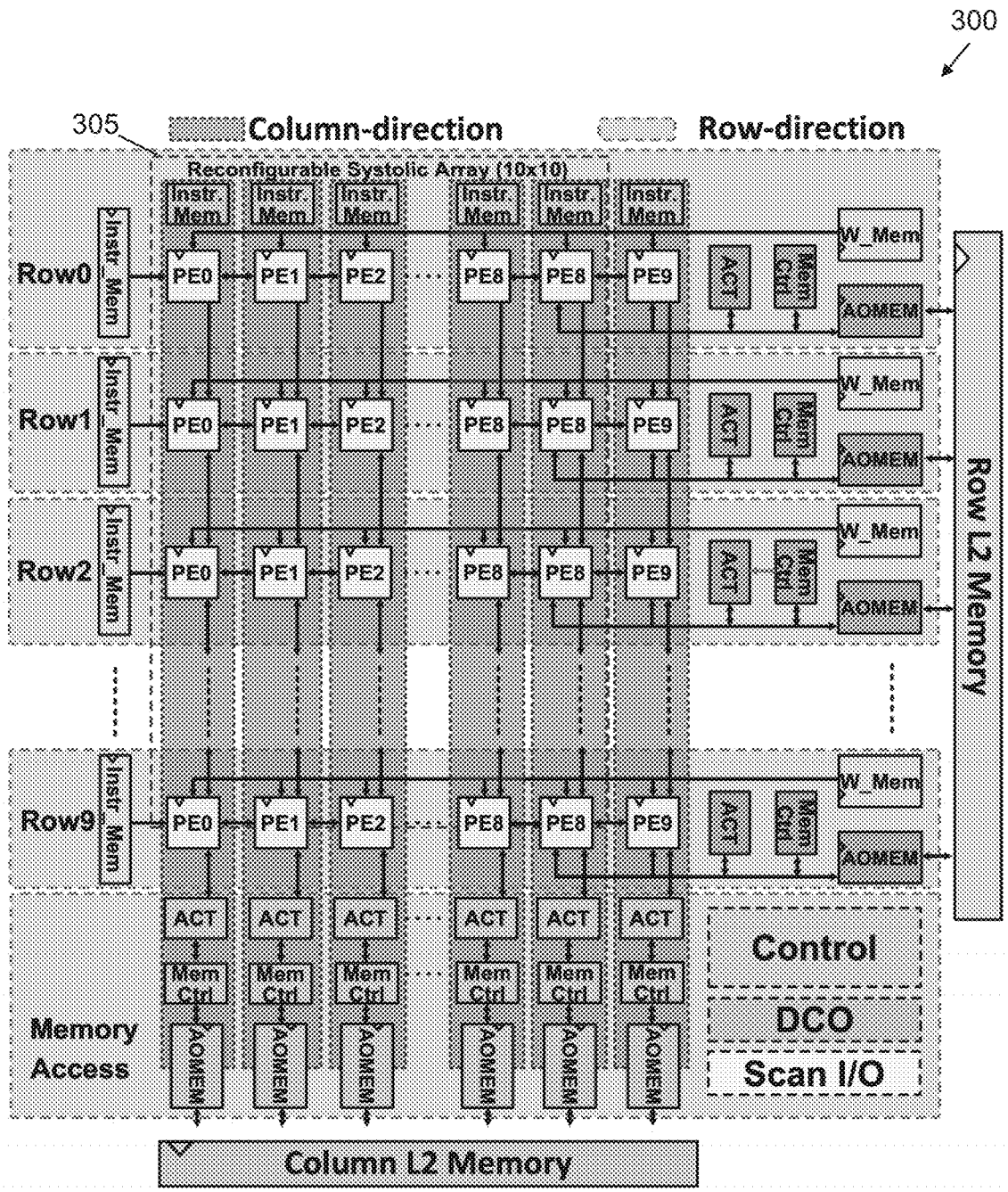
FIG. 3A is a schematic diagram that illustrates a top-level architecture of an exemplary SNCPU.
Figure 3B:
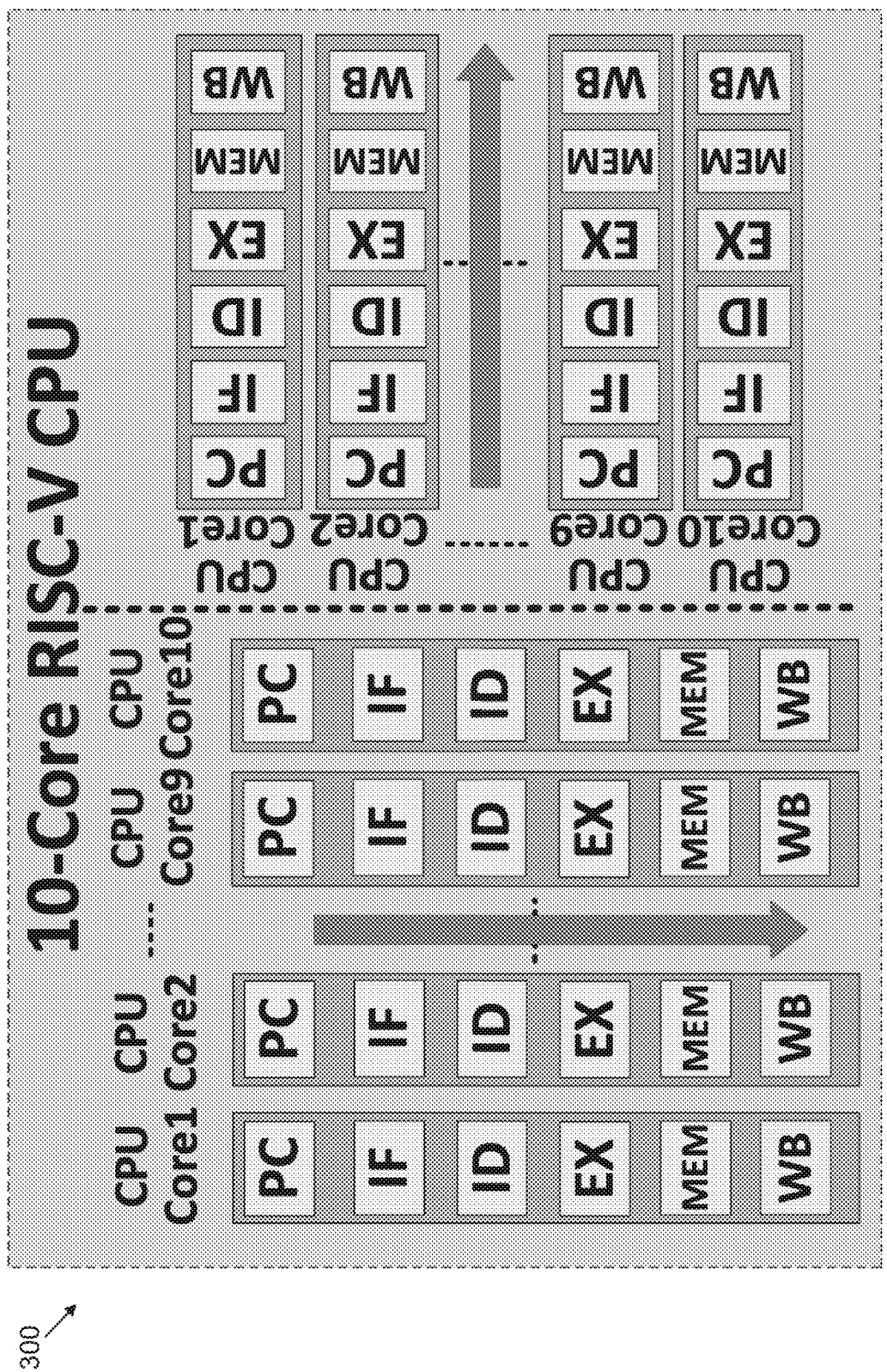
FIG. 3B is a schematic diagram that illustrates a top-level architecture of an exemplary SNCPU in a RISC-V CPU configuration mode.
Figure 3C:
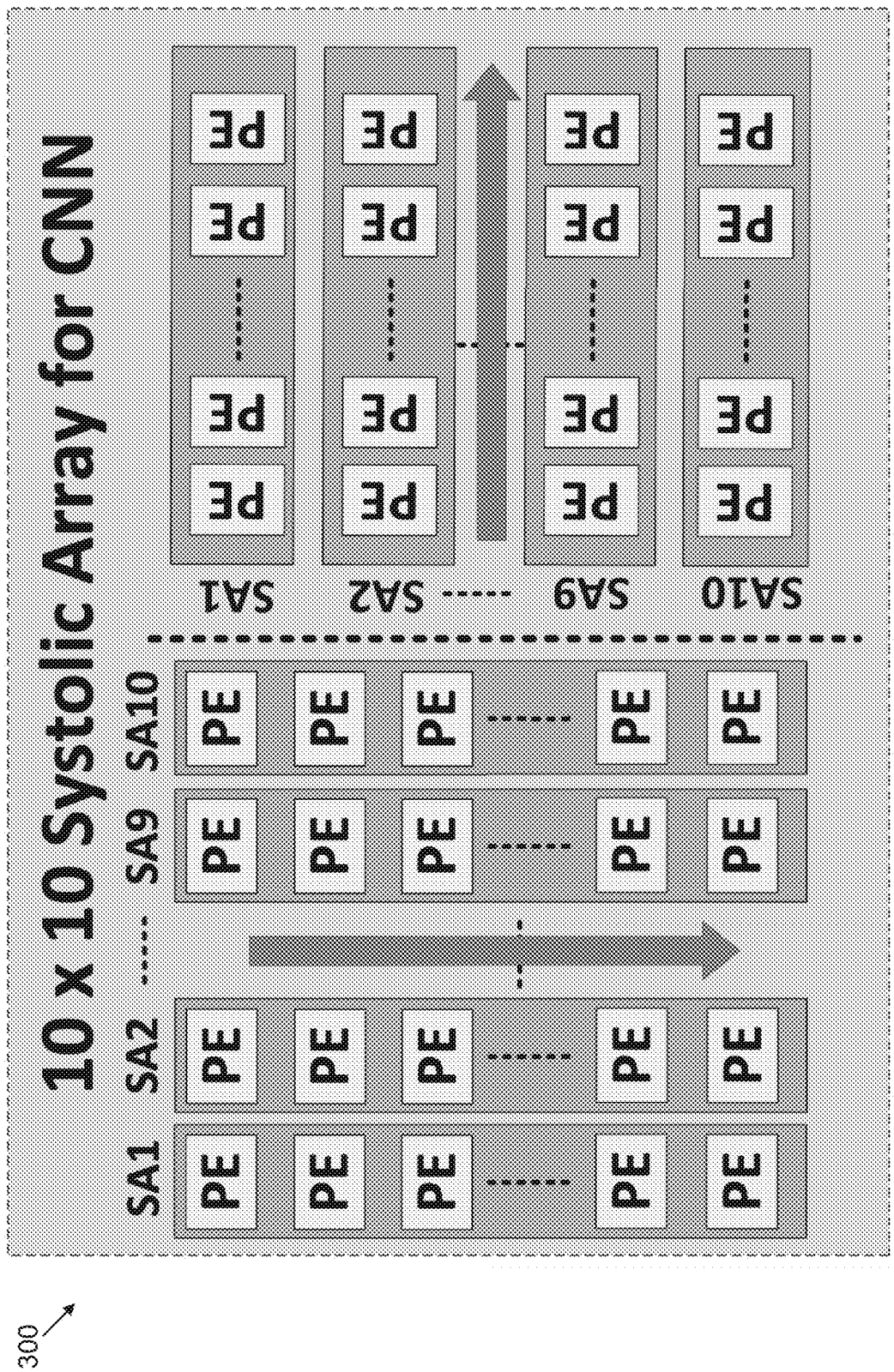
FIG. 3C is a schematic diagram that illustrates a top-level architecture of an exemplary SNCPU in a systolic array CNN configuration mode.
Figure 3D:
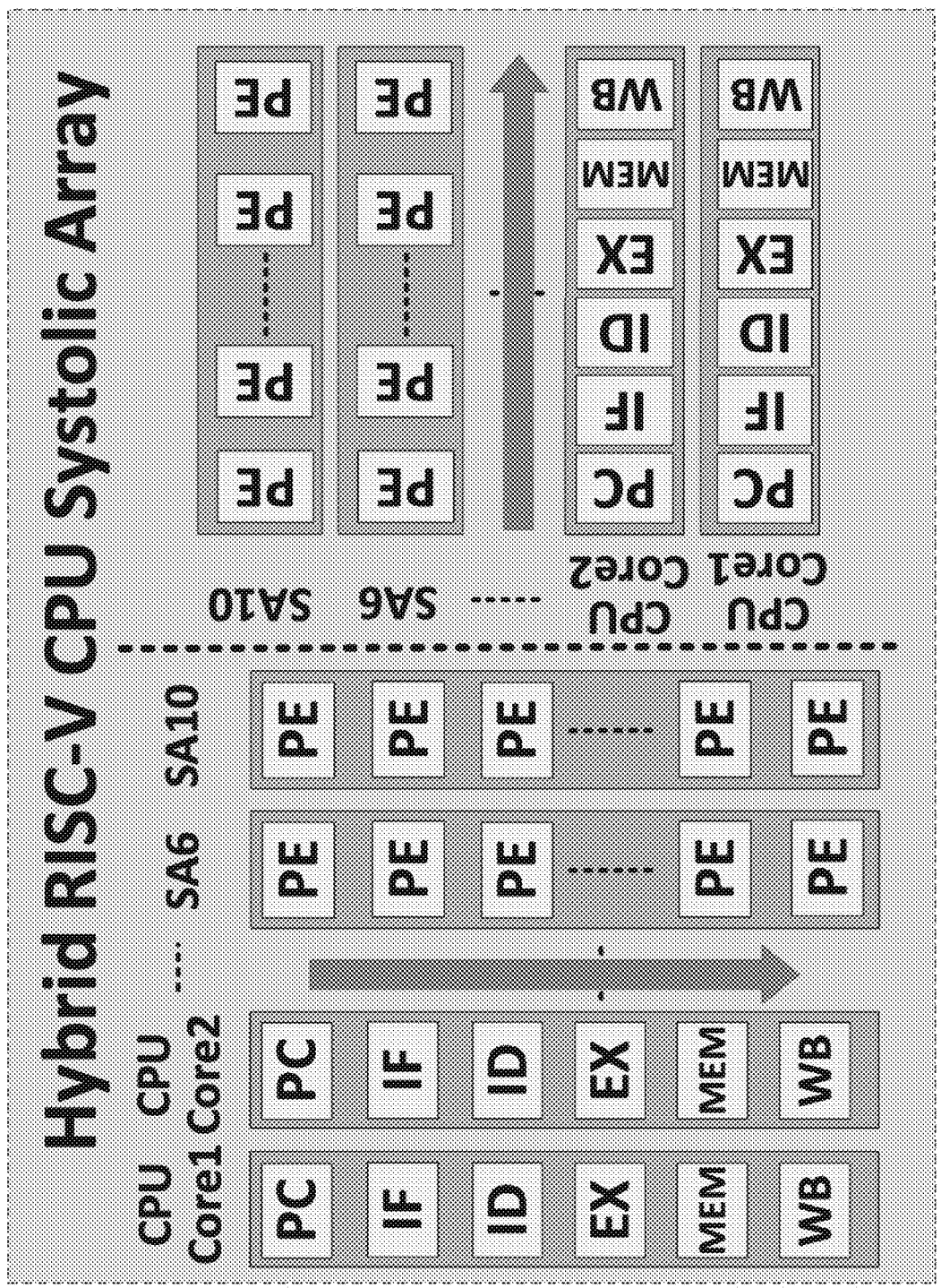
FIG. 3D is a schematic diagram that illustrates a top-level architecture of an exemplary SNCPU in a hybrid RISC-V CPU systolic array configuration mode.

FIG. 3A is a schematic diagram that illustrates a top-level architecture of an exemplary systolic neural CPU (SNCPU) 300. The SNCPU 300 may be an example of the SNCPU 200. The SNCPU 300 includes a reconfigurable systolic array 305 of PEs organized into rows and columns. As illustrated, the SNCPU 300 includes ten (10) rows (Row0 . . . Row9) and ten (10) columns of PEs (PE0 . . . PE9), but this should not be construed as limiting, as various examples of the SNCPU 300 may include more or fewer rows and/or columns of PEs in the reconfigurable systolic array. FIG. 3B is a schematic diagram that illustrates the exemplary SNCPU 300 in a RISC-V CPU configuration mode. FIG. 3C is a schematic diagram that illustrates the exemplary SNCPU 300 in a systolic array CNN configuration mode. FIG. 3D is a schematic diagram that illustrates the exemplary SNCPU 300 in a hybrid RISC-V CPU systolic array configuration mode. The reconfigurable systolic array 305, a 10×10 array of PEs as shown in FIG. 3A, may serve as the central computing tiles. Each lane of the PE array (e.g., each row or each column of PEs) may be configured as either systolic multiplication-accumulate (MAC) operations for the CNN accelerator or CPU pipeline stages.

In RISC-V CPU configuration mode (i.e., CPU mode) shown in FIG. 3B, each row or column of ten (10) PEs may be used to realize RISC-V pipelines. Associated static random access memory (SRAM) banks may also be reconfigured for both purposes. Although data may stay mostly local within the reconfigurable SRAM banks, level two (L2) SRAM banks (row L2 memory and column L2 memory) may also be included in CPU mode to enable data exchange between different CPU cores during data processing. Instruction caches (e.g., Instr. Mem. modules at the left side of each row and at the top of each column) may also be included in CPU mode.

The systolic array CNN configuration mode (i.e., accelerator mode) shown in FIG. 3C may support typical systolic dataflow with weight-stationary operations. In accelerator mode, an accumulator (ACT module) for each row or column may provide additional single instruction, multiple data (SIMD) support for pooling, rectified linear unit (ReLU) functionality, and accumulation. The ACT modules may also support activation and scaling.

In an available hybrid RISC-V CPU systolic array configuration mode (i.e., hybrid RISC-V and accelerator mode) shown in FIG. 3D, half of the PE cores in the reconfigurable systolic array 305 may be configured into CPU mode and the other half of the PE cores may be configured into the systolic CNN accelerator mode. The hybrid mode features bi-directional dataflow. Each row and/or column may be configured as one RISC-V pipeline core. The AOMEM modules at the bottom of each column and the right of each row in hybrid mode may be reconfigurable as activation memory (A_mem), output memory (O_mem), or data cache modules.

Figure 4A:
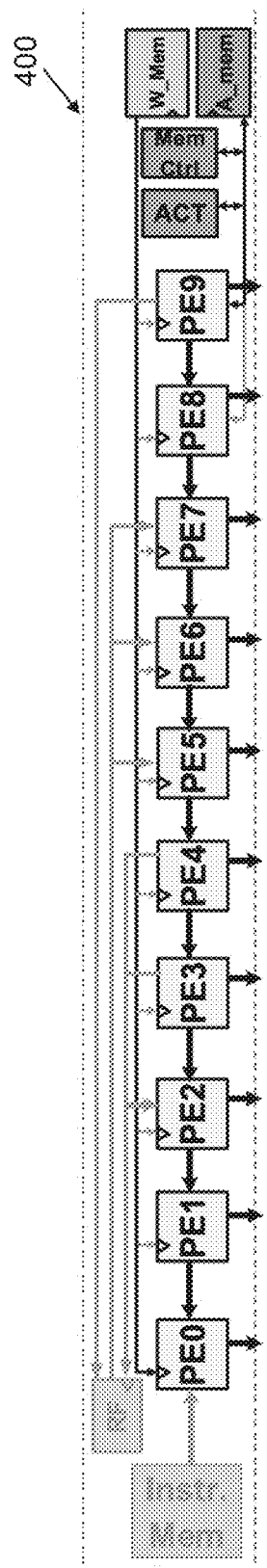
FIG. 4A is a schematic diagram that illustrates one row of the exemplary reconfigurable systolic array of PEs illustrated in FIG. 3A.
Figure 4B:
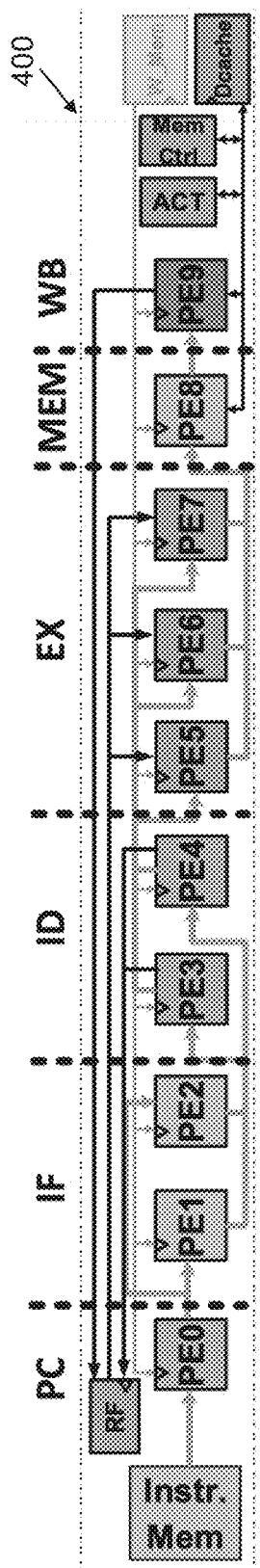
FIG. 4B is a schematic diagram that illustrates one row of the exemplary reconfigurable systolic array of PEs illustrated in FIG. 3A reconfigured as one exemplary RISC-V CPU core.

FIG. 4A is a schematic diagram that illustrates one row 400 of the exemplary reconfigurable systolic array 305. FIG. 4B is a schematic diagram that illustrates one row 400 of the exemplary reconfigurable systolic array 305 reconfigured as one exemplary RISC-V CPU core. Either a row or a column of PEs may be reconfigured as one RISC-V CPU core, in various examples. The RISC-V CPU core may include a 32b RISC-V CPU pipeline constructed from the systolic array 305 of PEs. Similar to a typical accelerator design, each PE in the systolic array 305 may include a simple pipelined multiplication-accumulate (MAC) unit with 8b-wide inputs and weights and 32b at accumulation output. As shown in FIG. 4B, when the row 400 of PEs is configured as a RISC-V CPU core, the A_mem or AOMEM (see FIG. 3A) memory unit at the far right of the row 400 may be reconfigured as a data cache Dcache. As the Dcache is bidirectionally communicatively coupled with the memory controller Mem Ctrl, WB PE9, and MEM PE8 of the RISC-V CPU core of row 400, any data stored in the memory unit Dcache (including data inherited from the A_mem or AOMEM memory elements prior to being configured as a data cache Dcache) may be transferred from the Dcache at the end of the RISC-V CPU pipeline to the register file RF to be operated upon in the EX stage according to the instruction(s) fetched in the IF stage and decoded in the ID stage.

Figure 4C:
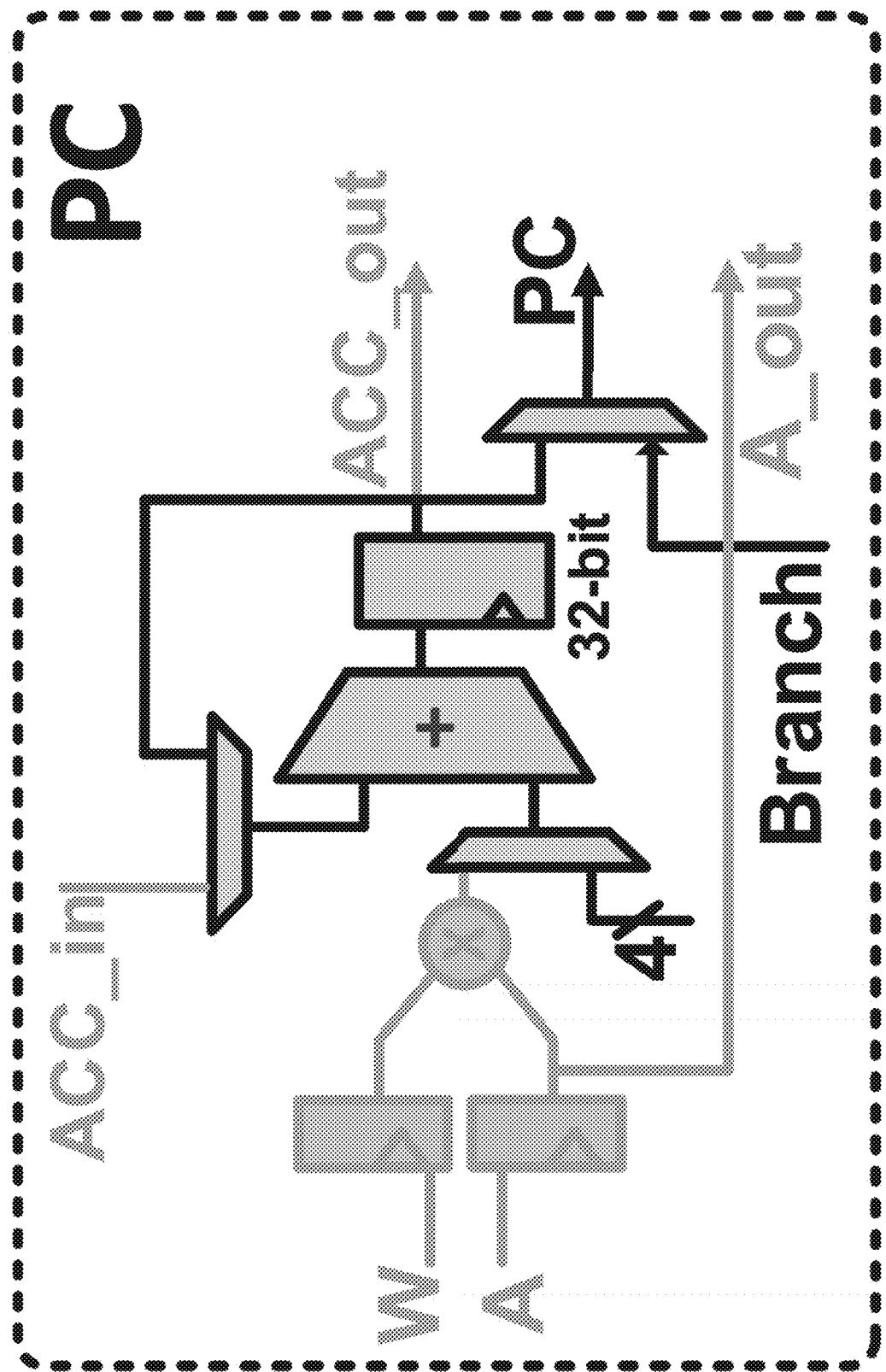
FIG. 4C is a schematic diagram that illustrates one PE of the exemplary RISC-V CPU core shown in FIG. 4B configured for program counter (PC) calculations.

FIG. 4C is a schematic diagram that illustrates one PE of the exemplary RISC-V CPU core shown in FIG. 4B configured for program counter (PC) calculations. As shown in FIG. 4C, the very first PE in a row (e.g., PE0) or column reconfigured as one exemplary RISC-V CPU core may reuse the MAC's adder and 32b registers as PC for the instruction cache address.

Figure 4D:
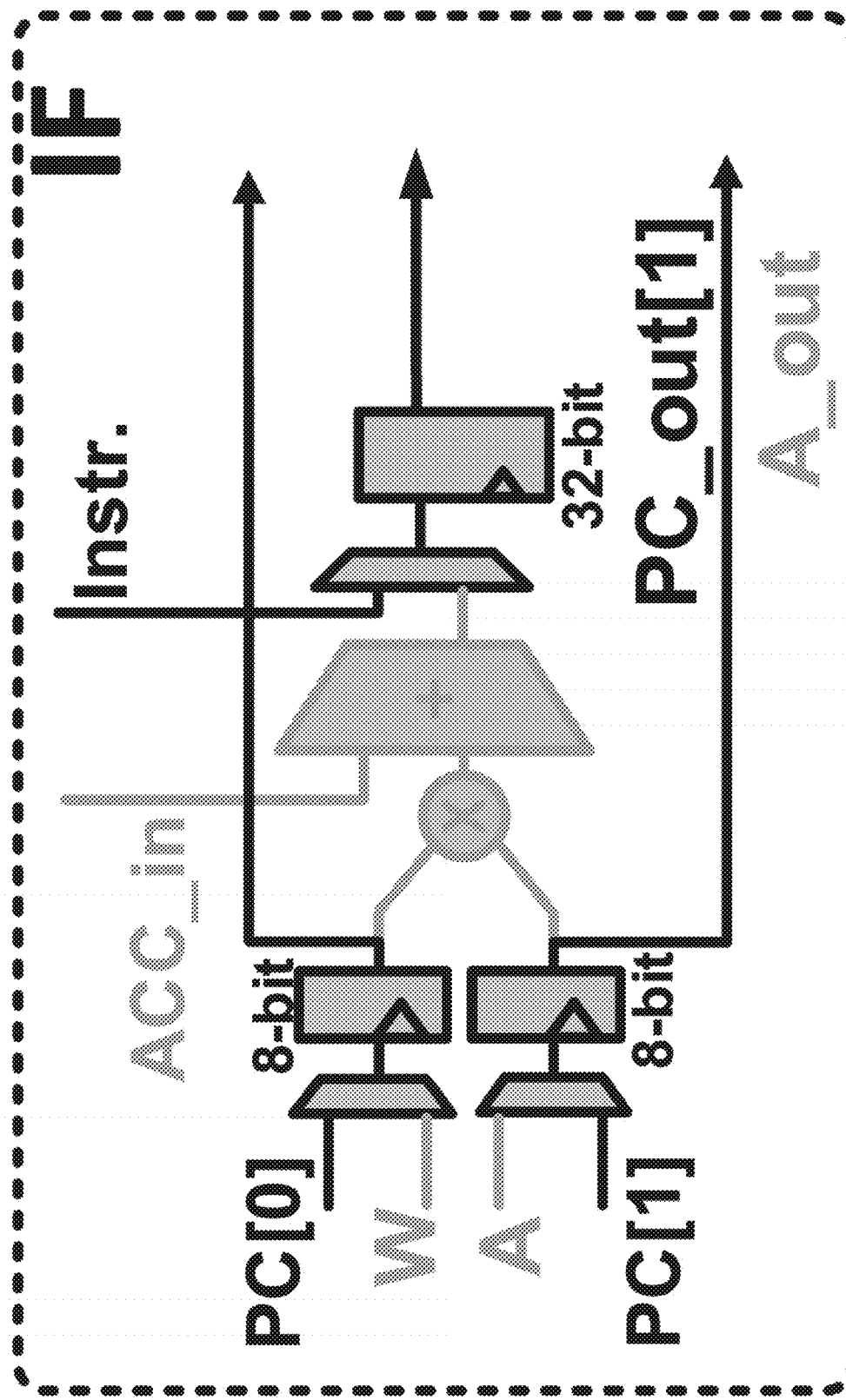
FIG. 4D is a schematic diagram that illustrates two PEs of the exemplary RISC-V CPU core shown in FIG. 4B configured for instruction fetch (IF) operations.

FIG. 4D is a schematic diagram that illustrates two PEs of the exemplary RISC-V CPU core shown in FIG. 4B configured for instruction fetch (IF) operations. Two PEs (PE1 and PE2) are used as the IF stage for instruction fetch with a reuse of the internal 32b register and 8b input registers.

Figure 4E:
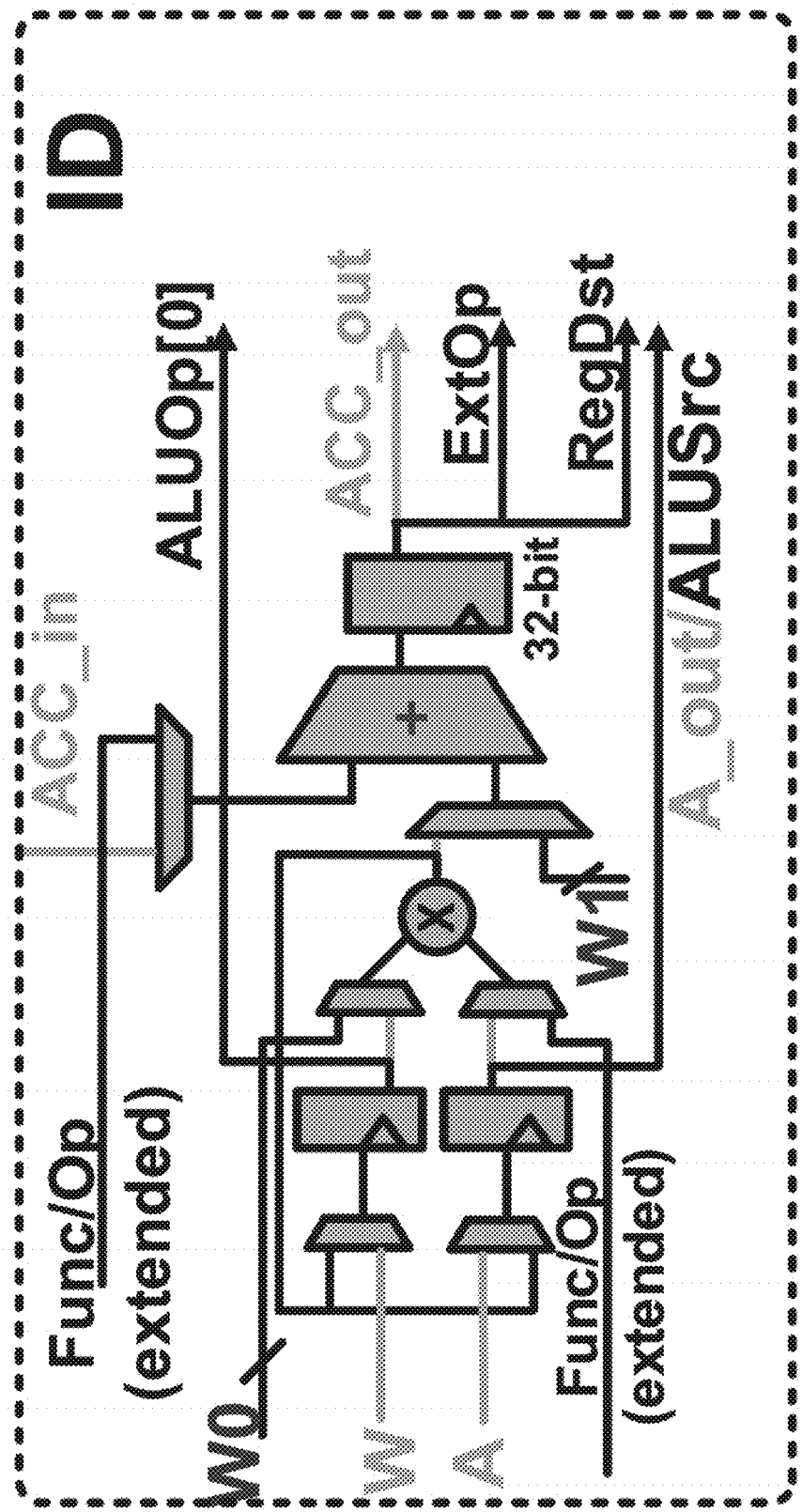
FIG. 4E is a schematic diagram that illustrates a first of two PEs of the exemplary RISC-V CPU core shown in FIG. 4B configured for instruction decode (ID) operations.
Figure 4F:
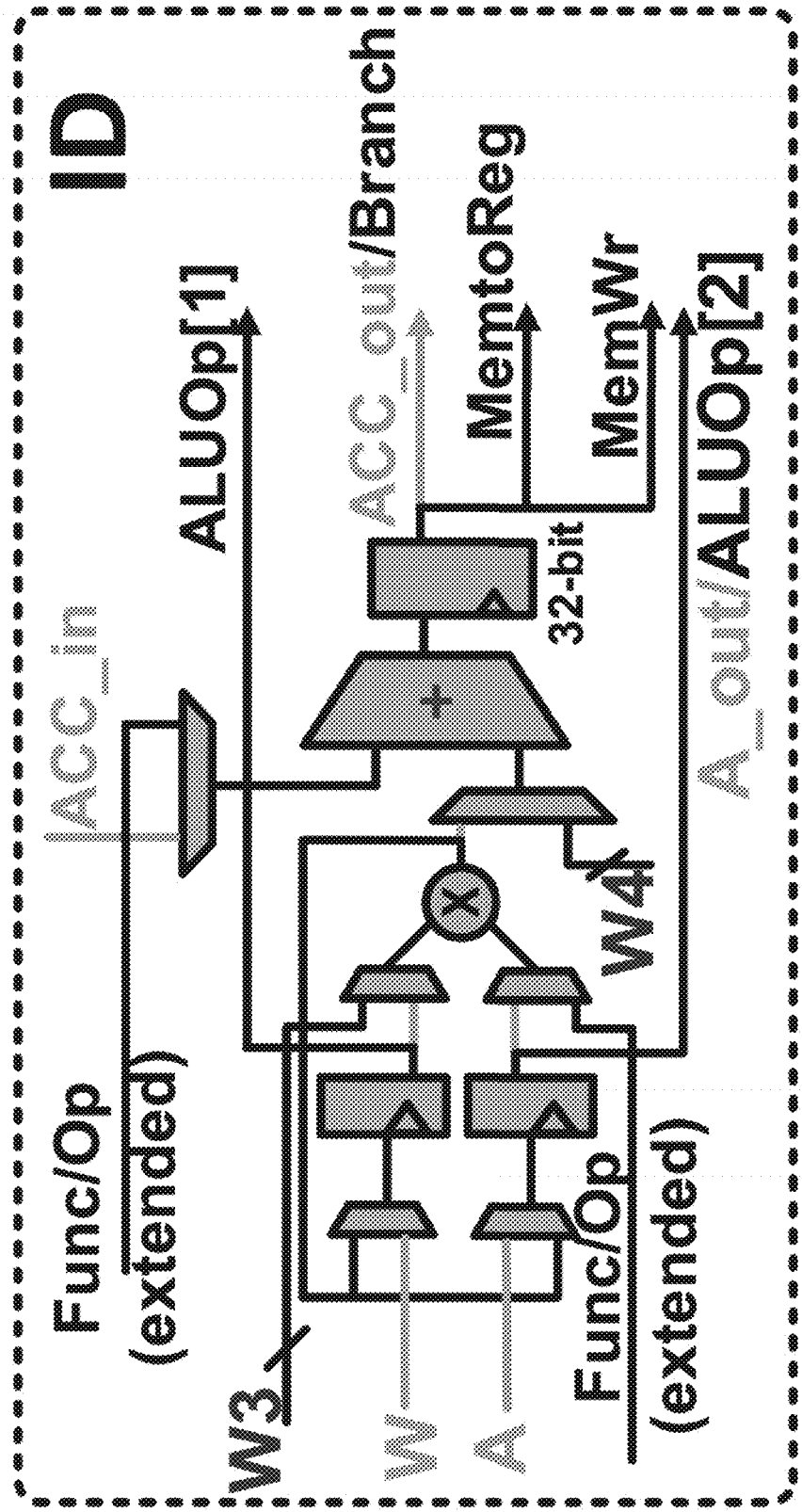
FIG. 4F is a schematic diagram that illustrates a second of two PEs of the exemplary RISC-V CPU core shown in FIG. 4B configured for ID operations.

FIG. 4E is a schematic diagram that illustrates a first (PE3) of two PEs of the exemplary RISC-V CPU core shown in FIG. 4B configured for instruction decode (ID) stage operations. FIG. 4F is a schematic diagram that illustrates a second (PE4) of two PEs of the exemplary RISC-V CPU core shown in FIG. 4B configured for ID stage operations. Two PEs are reconfigured into the instruction decode/decoder (ID) stage where the logic in the 8b multiplier and 32b adder are reused to generate control signals by performing numerical/logical operations with the op-code or func-code of instructions.

Figure 4G:
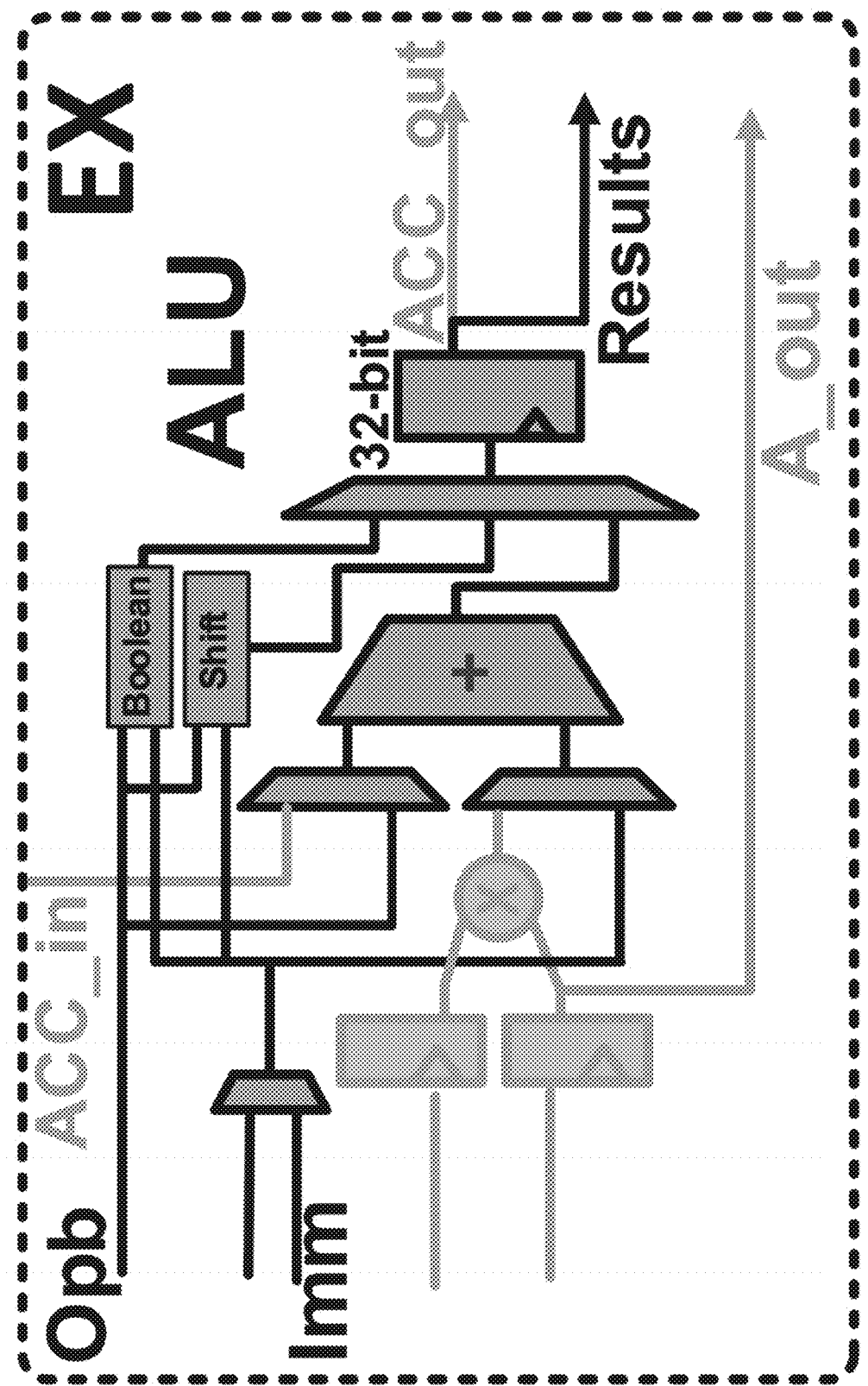
FIG. 4G is a schematic diagram that illustrates an EX stage ALU reconfigured from some portions of three PEs of the exemplary RISC-V CPU core shown in FIG. 4B.
Figure 4H:
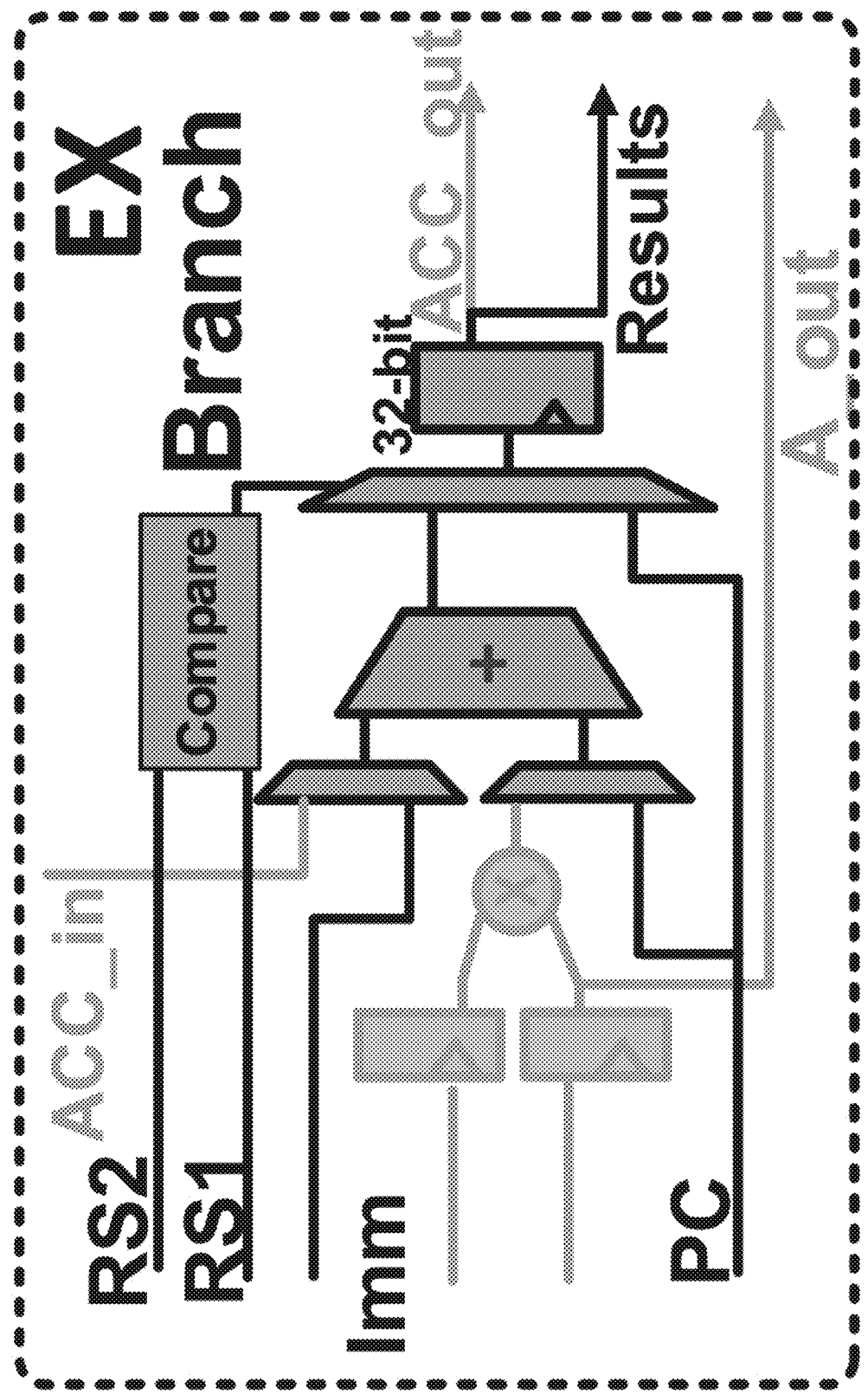
FIG. 4H is a schematic diagram that illustrates an EX stage branch reconfigured from other portions of the three PEs of the exemplary RISC-V CPU core shown in FIG. 4B.

FIG. 4G is a schematic diagram that illustrates an EX stage ALU reconfigured from some portions of three PEs (PE5, PE6, PE7) of the exemplary RISC-V CPU core shown in FIG. 4B, and FIG. 4H is a schematic diagram that illustrates an EX stage branch reconfigured from other portions of the three PEs (PE5, PE6, PE7) of the exemplary RISC-V CPU core shown in FIG. 4B. Three PEs (PE5, PE6, PE7) may be combined into the execution (EX) stage, including one PE serving as arithmetic logic unit (ALU) with additional logic for Boolean operations and a shifter, one PE to generate new instruction cache address for branches, and one PE used as registers to pass the execution results.

Figure 4I:
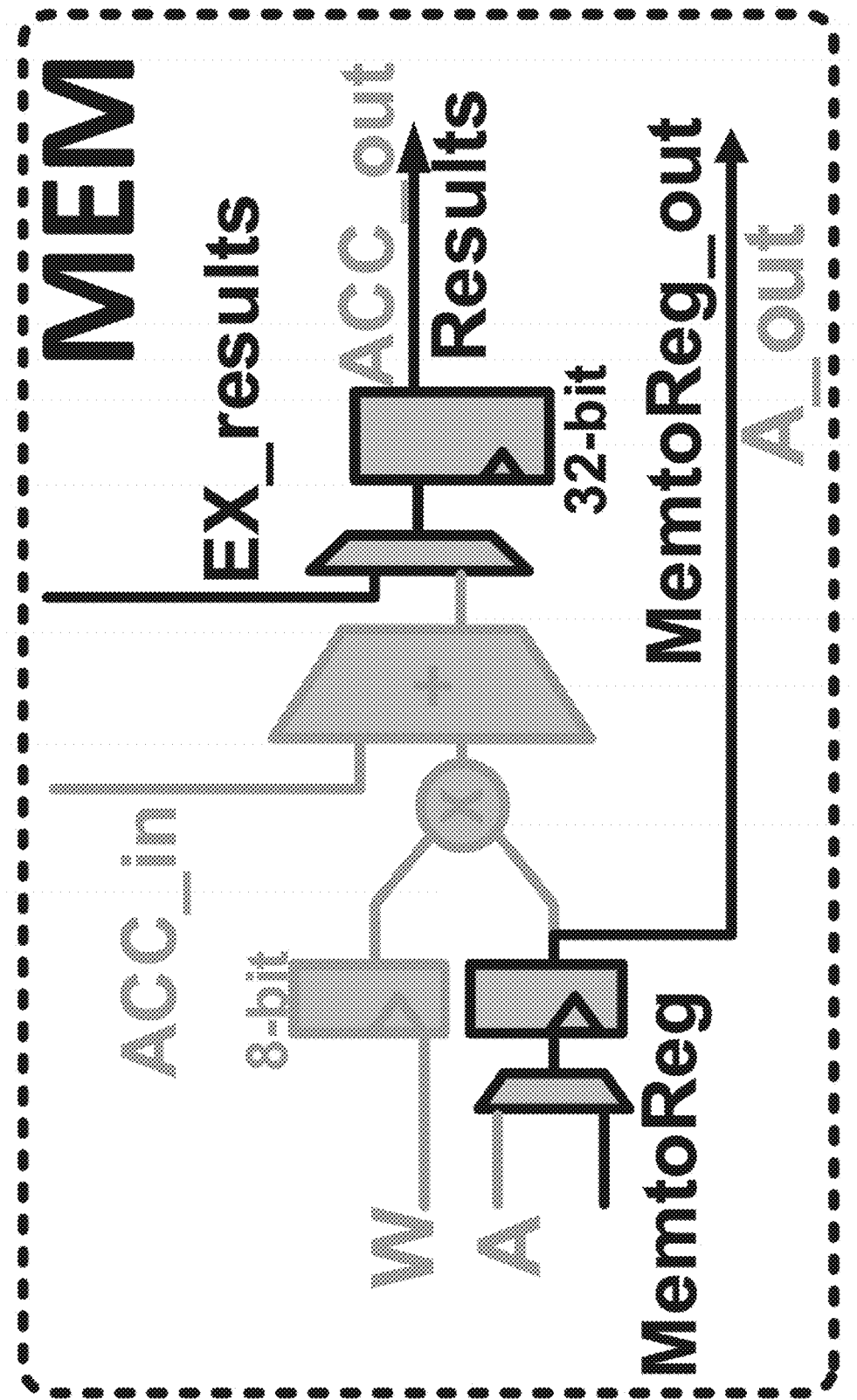
FIG. 4I is a schematic diagram that illustrates one PE of the exemplary RISC-V CPU core shown in FIG. 4B configured for memory (MEM) stage operations.
Figure 4J:
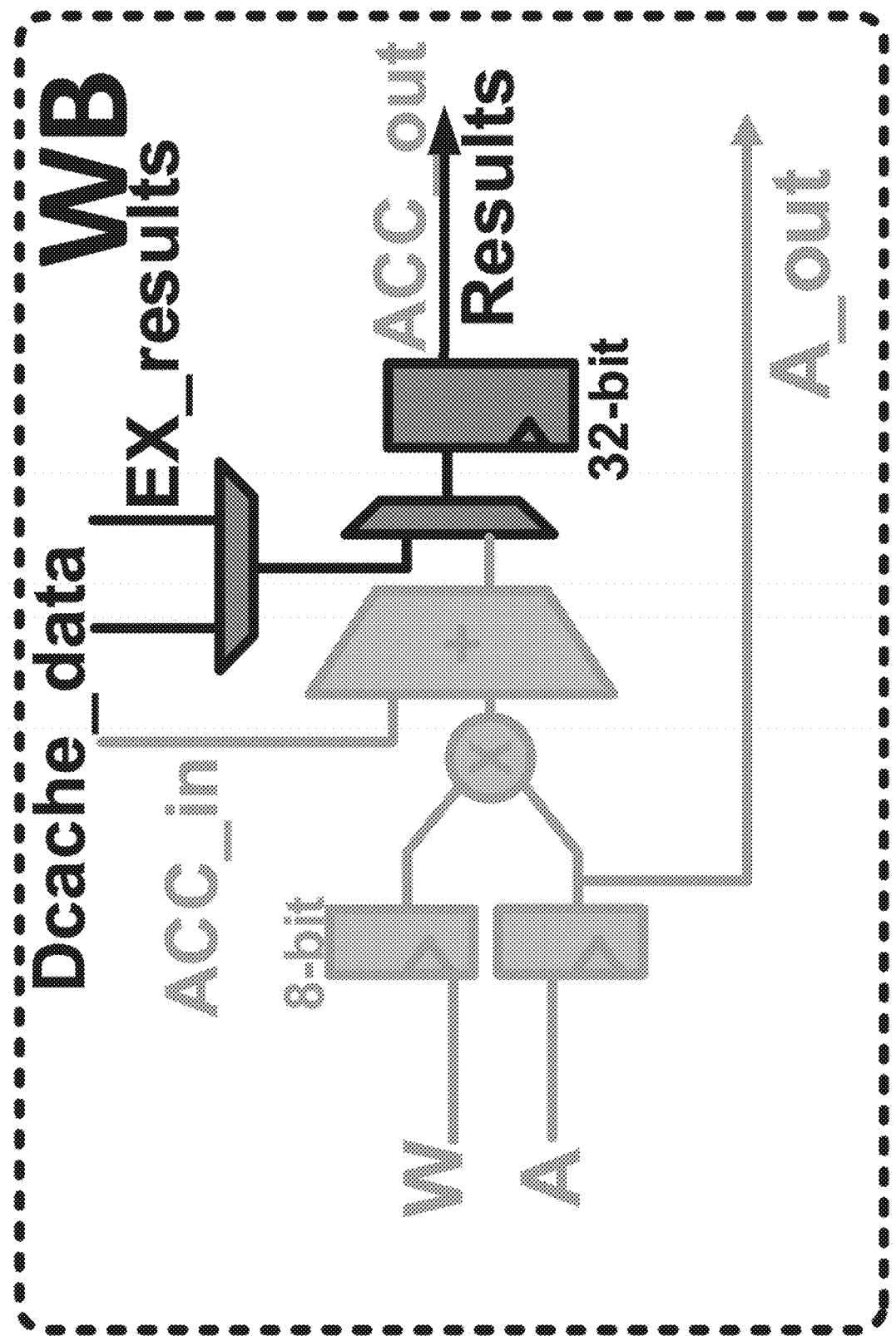
FIG. 4J is a schematic diagram that illustrates one PE of the exemplary RISC-V CPU core shown in FIG. 4B configured for write-back (WB) stage operations.

FIG. 4I is a schematic diagram that illustrates one PE (PE8) of the exemplary RISC-V CPU core shown in FIG. 4B configured for memory (MEM) stage operations. FIG. 4J is a schematic diagram that illustrates one PE (PE9) of the exemplary RISC-V CPU core shown in FIG. 4B configured for write-back (WB) stage operations. The last two PEs (PE8, PE9) of the exemplary RISC-V CPU core shown in FIG. 4B may be reconfigured into the memory (MEM) stage and the write-back (WB) stage by reusing registers with additional multiplexer (MUX) logic. Registers may be reused for fetched data. Forwarding paths may also be added to support CPU data dependency.

Figure 5A:
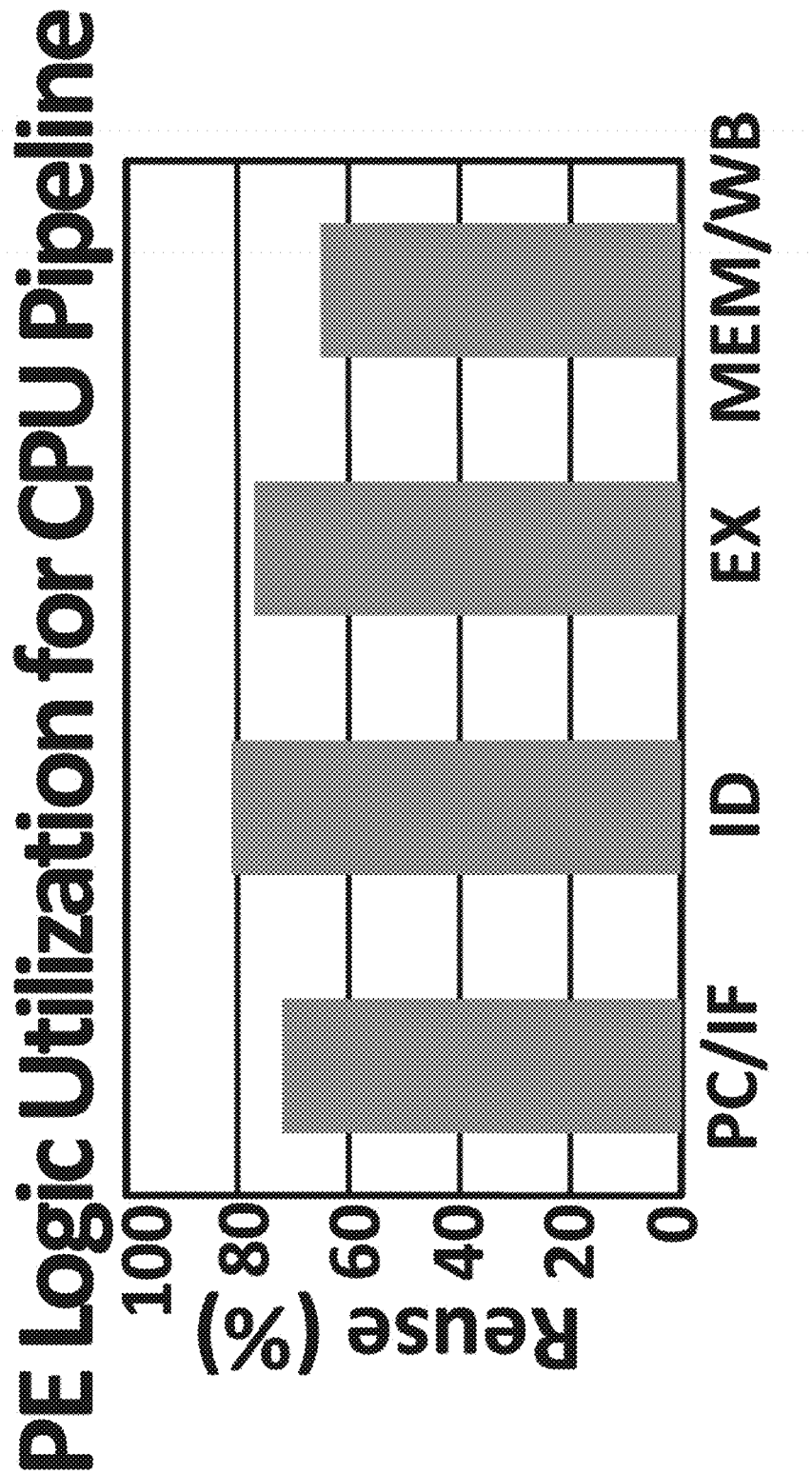
FIG. 5A is a graph that illustrates exemplary PE logic utilization for the CPU pipeline of the exemplary RISC-V CPU core shown in FIG. 4B.

FIG. 5A is a graph that illustrates exemplary PE logic utilization for the CPU pipeline of the RISC-V CPU core shown in FIG. 4B.

Figure 5B:
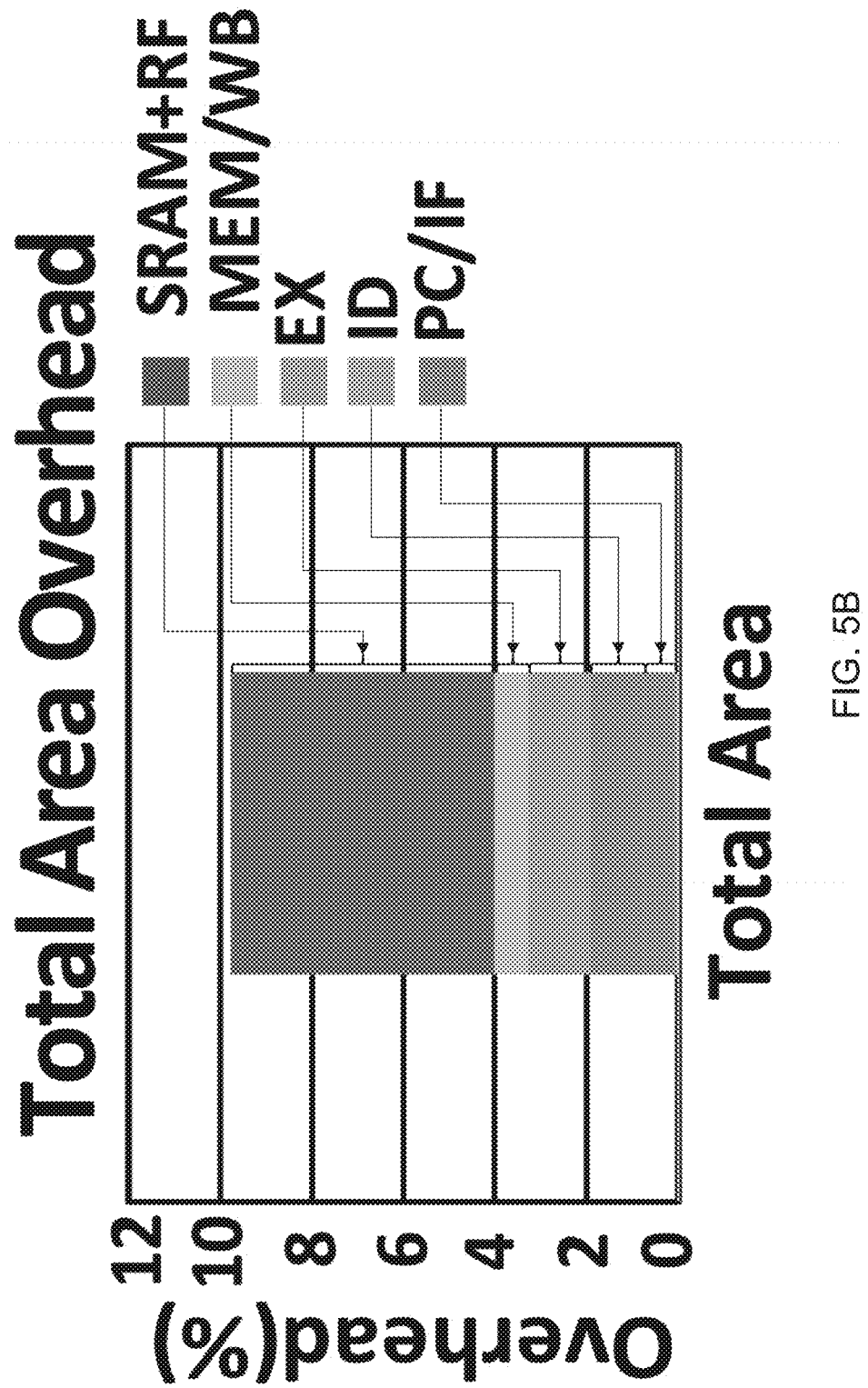
FIG. 5B is a graph that illustrates exemplary total area overhead for the CPU pipeline of the exemplary RISC-V CPU core shown in FIG. 4B.

FIG. 5B is a graph that illustrates exemplary total area overhead for the CPU pipeline of the RISC-V CPU core shown in FIG. 4B.

Figure 5C:
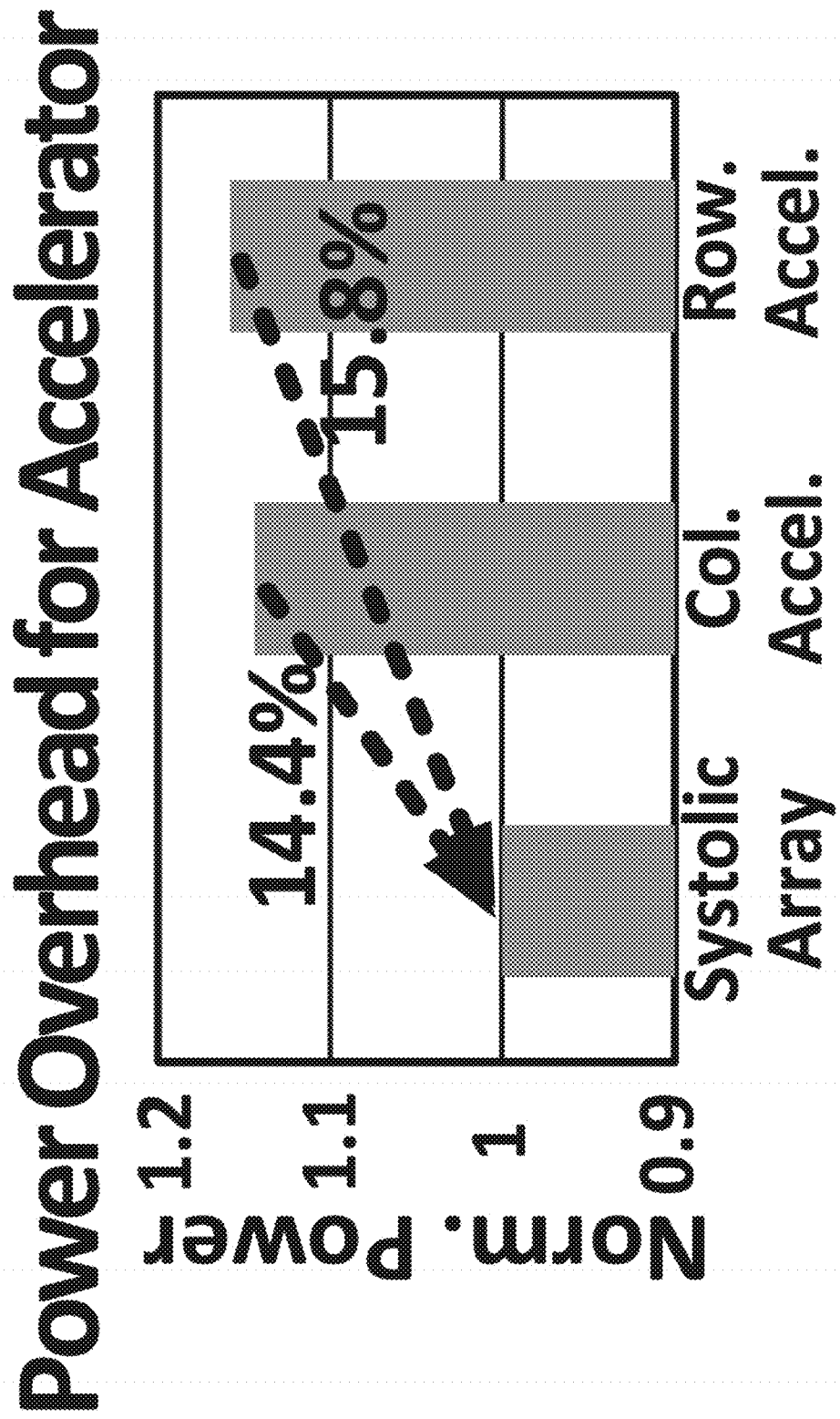
FIG. 5C is a graph that illustrates exemplary accelerator power overhead for the CPU pipeline of the exemplary RISC-V CPU core shown in FIG. 4B.

FIG. 5C is a graph that illustrates exemplary accelerator power overhead for the CPU pipeline of the RISC-V CPU core shown in FIG. 4B. With an emphasis on logic sharing, an exemplary PE logic reconfiguration for CPU mode may reuse 64% to 80% of the original PE logic for CPU construction, as shown in FIG. 5A. In an example compared with the baseline original systolic CNN accelerator design, the area overhead to include CPU functions is 3.4% in the PE array, 6.4% in the memory (e.g., instruction and register file (RF)), and overall 9.8% for the whole processor, as shown in FIG. 5B. Extensive clock gating may be used to eliminate redundant power consumption from the additional logic in both CPU and CNN modes. In an example, the power overhead for the CNN accelerator is about 15% compared with the baseline original systolic CNN accelerator design, as shown in FIG. 5C.

Figure 6:
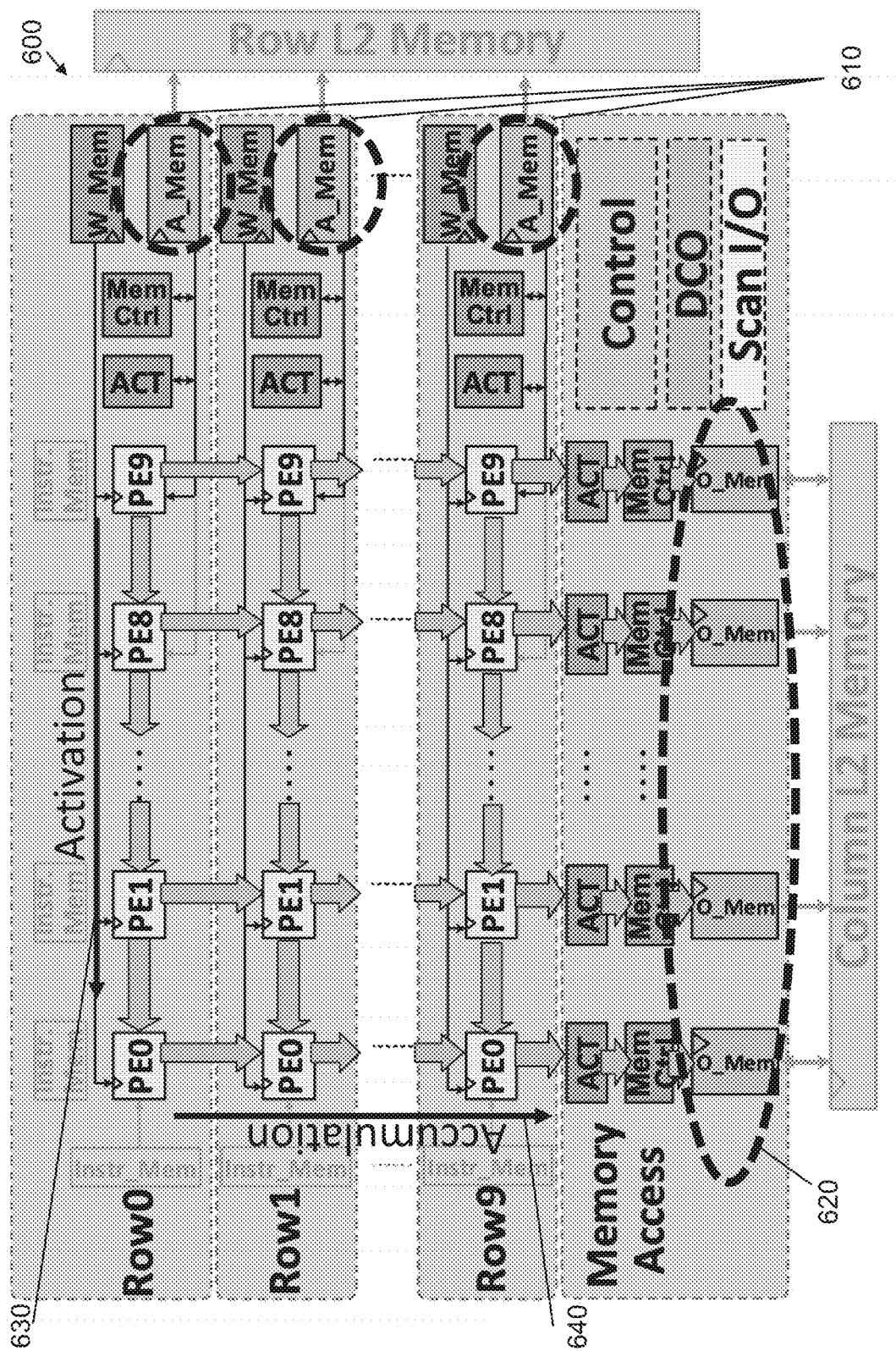
FIG. 6 is a schematic diagram that illustrates an exemplary reconfigurable systolic array of PEs of an SNCPU reconfigured for a column-accelerator mode dataflow.
Figure 7:
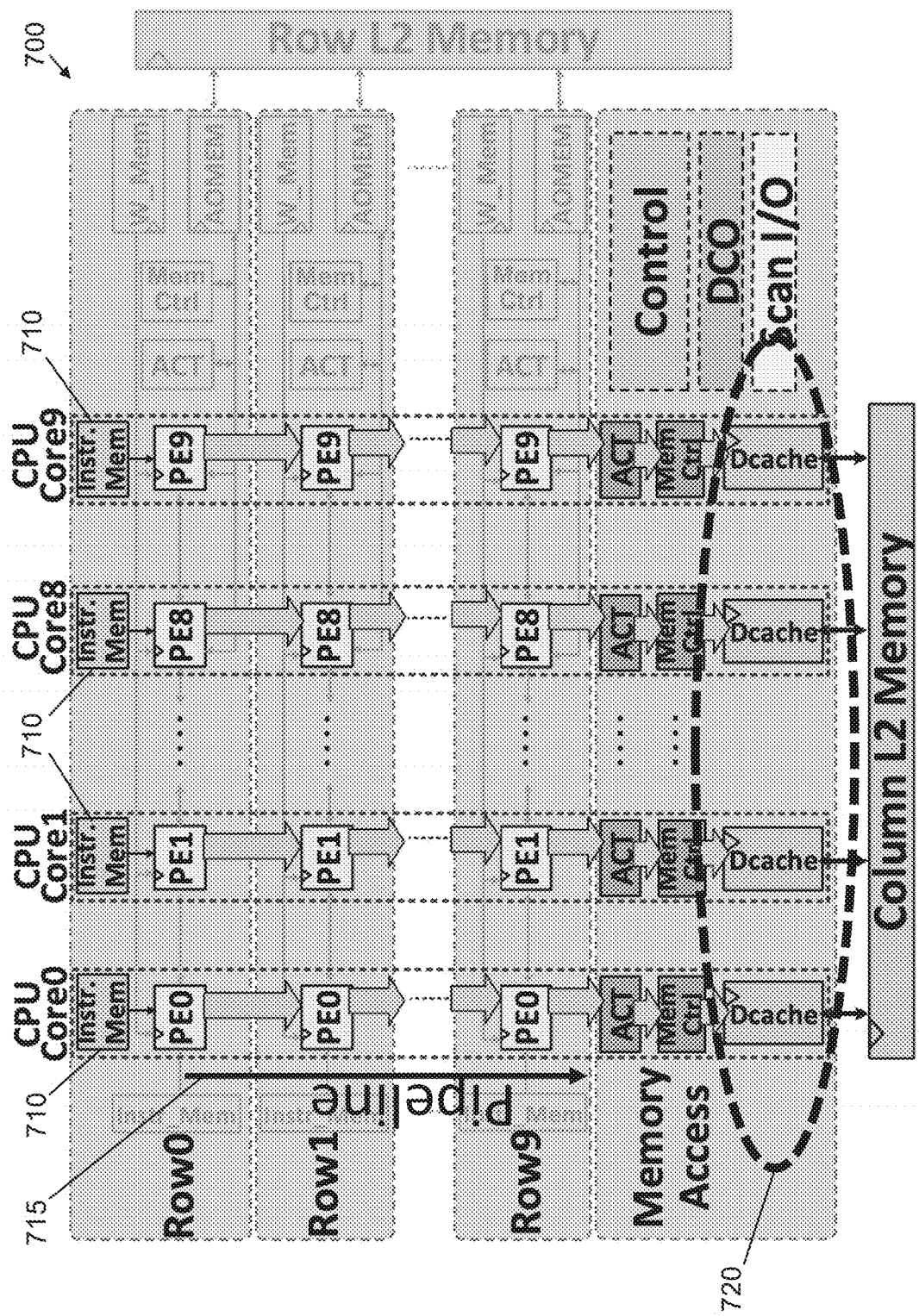
FIG. 7 is a schematic diagram that illustrates an exemplary reconfigurable systolic array of PEs of an SNCPU reconfigured for a column-CPU mode dataflow.
Figure 8:
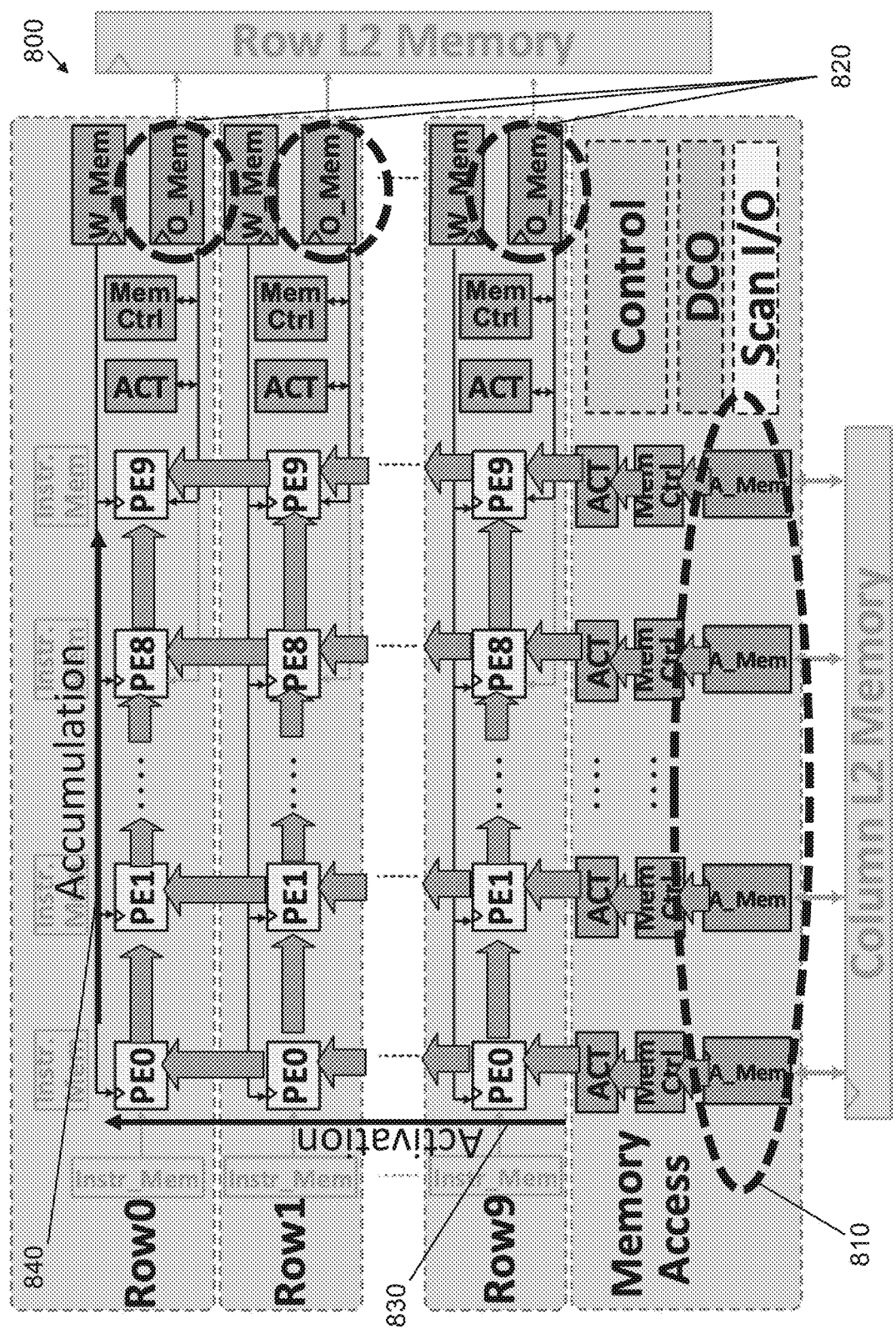
FIG. 8 is a schematic diagram that illustrates an exemplary reconfigurable systolic array of PEs of an SNCPU reconfigured for a row-accelerator mode dataflow.
Figure 9:
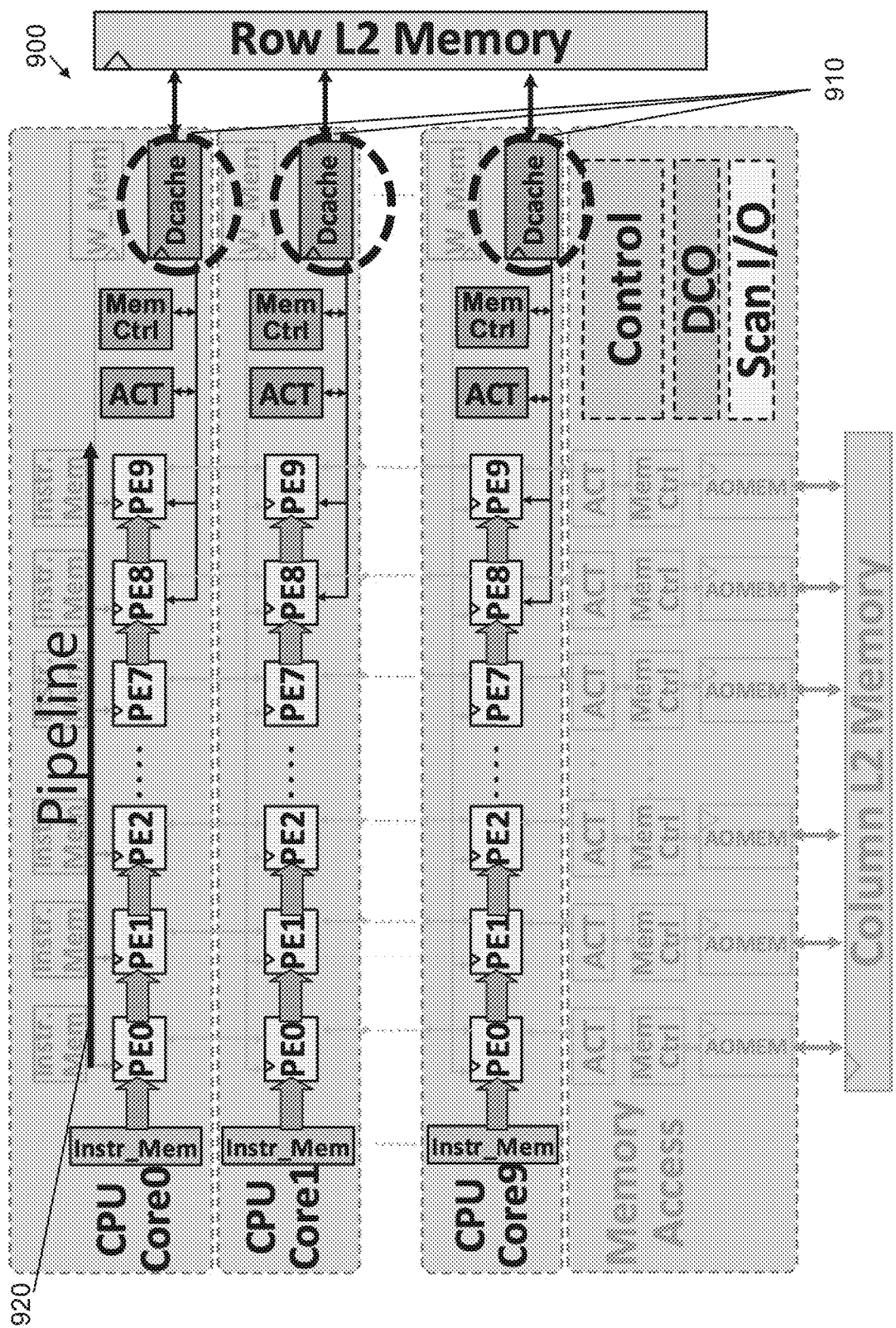
FIG. 9 is a schematic diagram that illustrates an exemplary reconfigurable systolic array of PEs of an SNCPU reconfigured for a row-CPU mode dataflow.
Figure 10A:
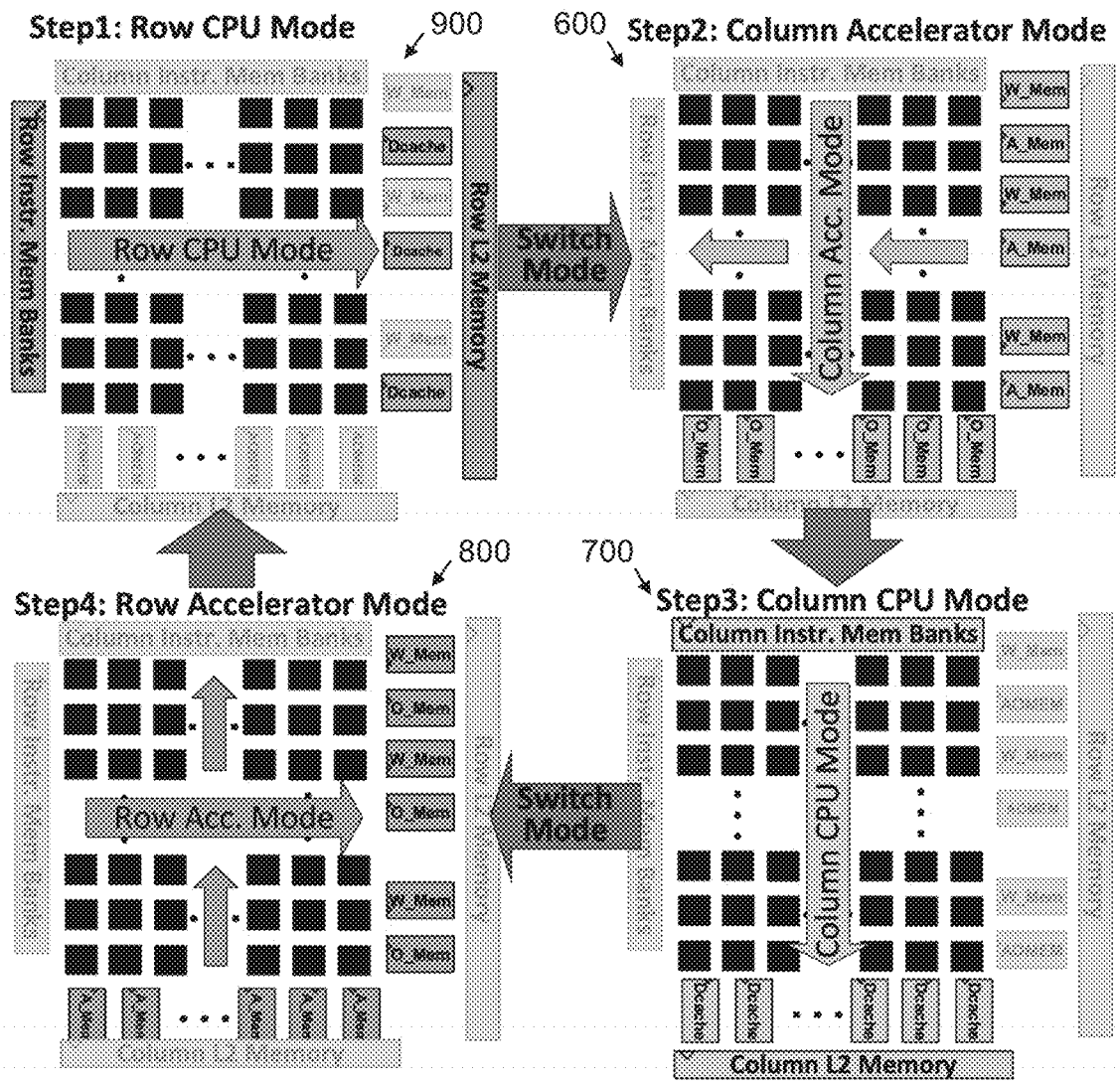
FIGS. 10A-10F illustrate a four-phase (4-phase) dataflow utilizing the four dataflow configurations of an SNCPU described with reference to FIGS. 6-9.
Figure 10B:
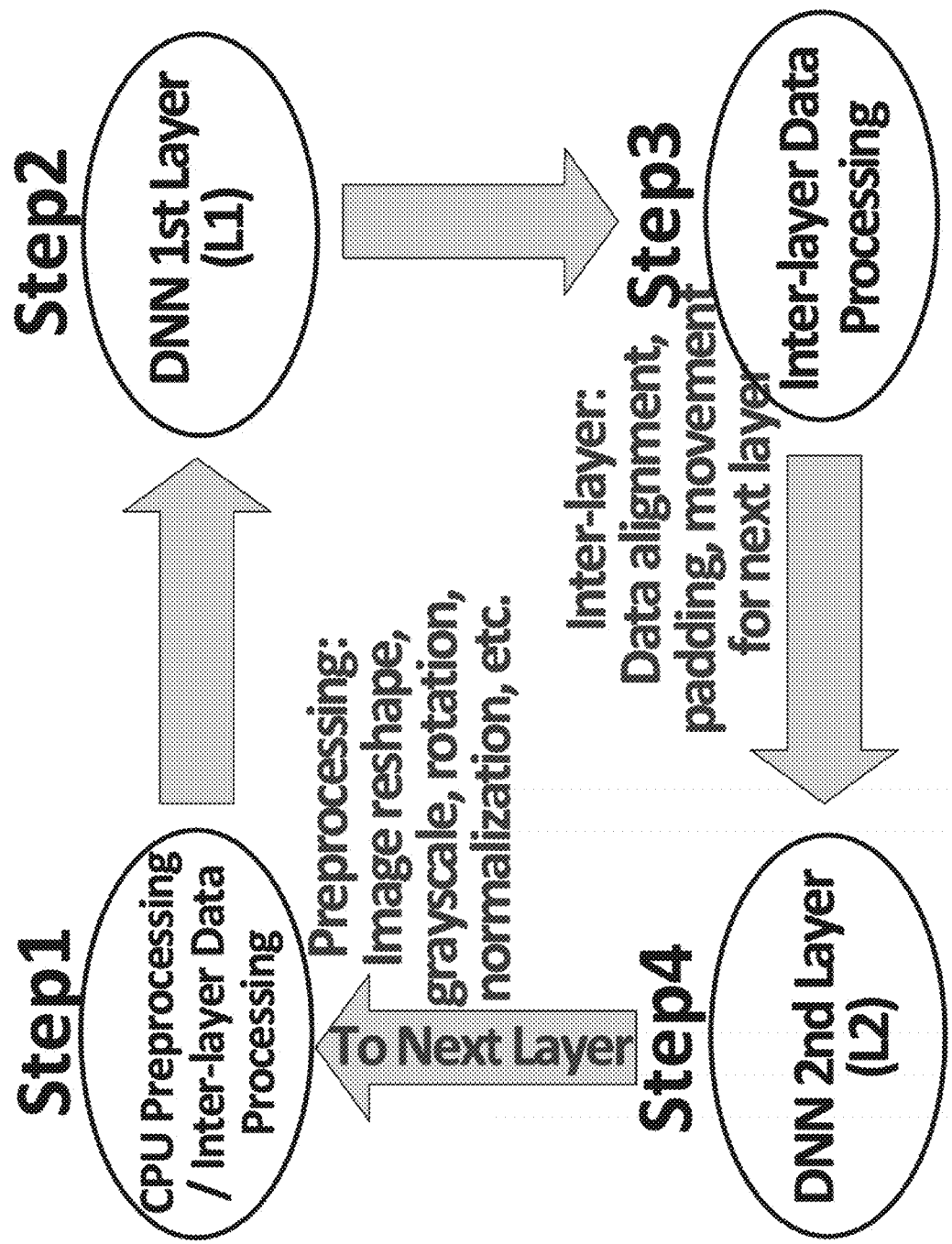
Figure 10C:
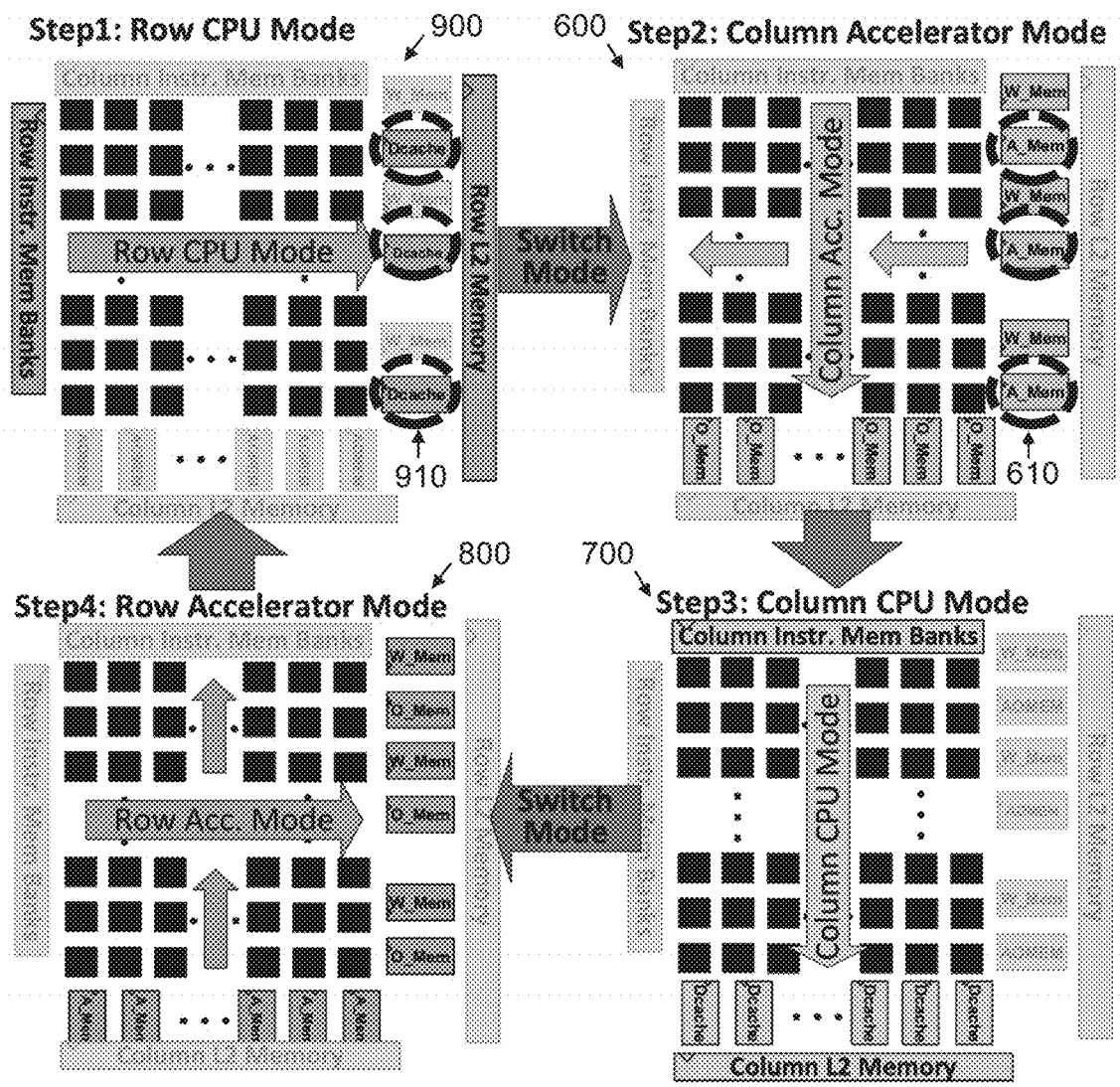
Figure 10D:
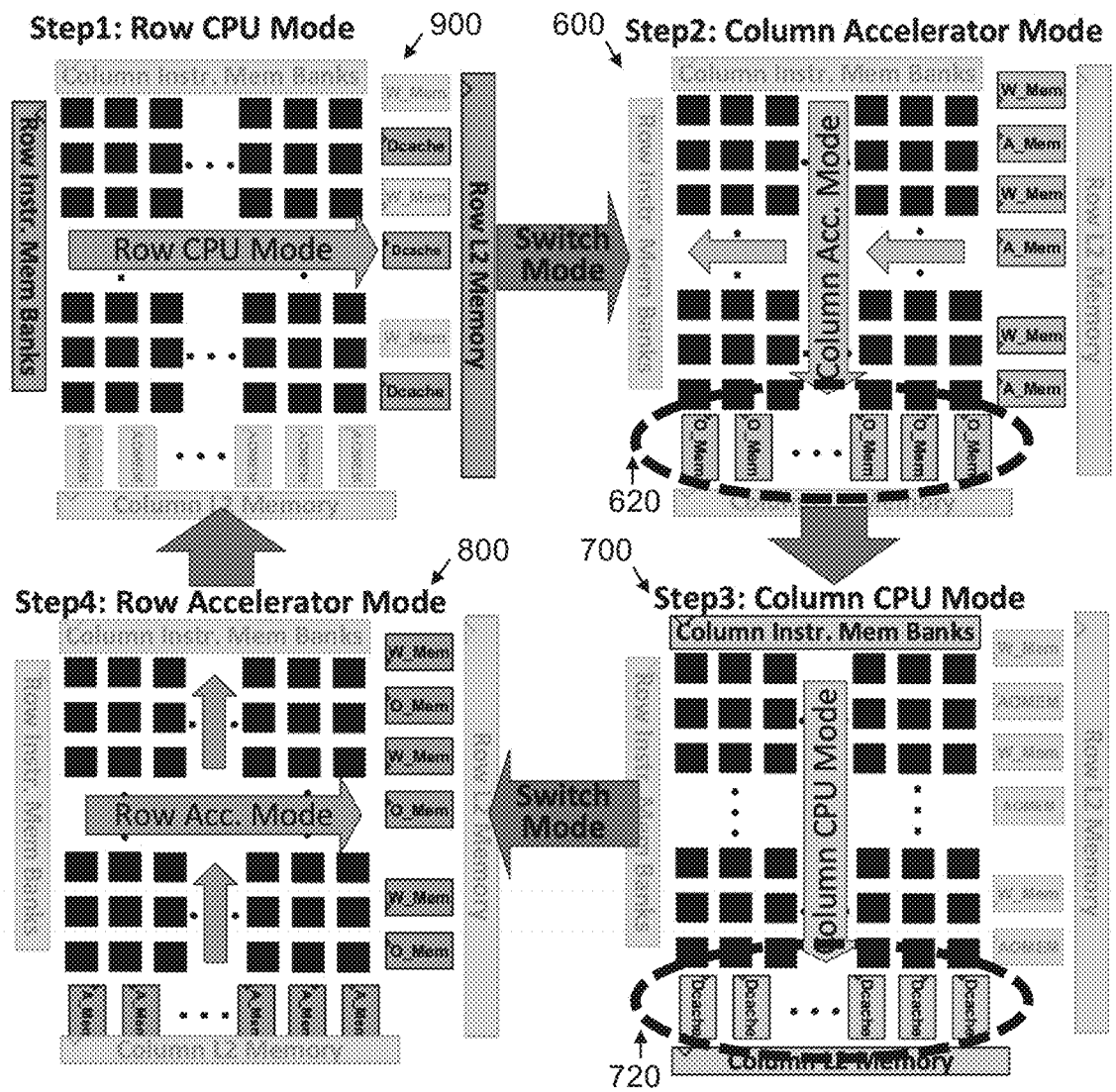
Figure 10E:
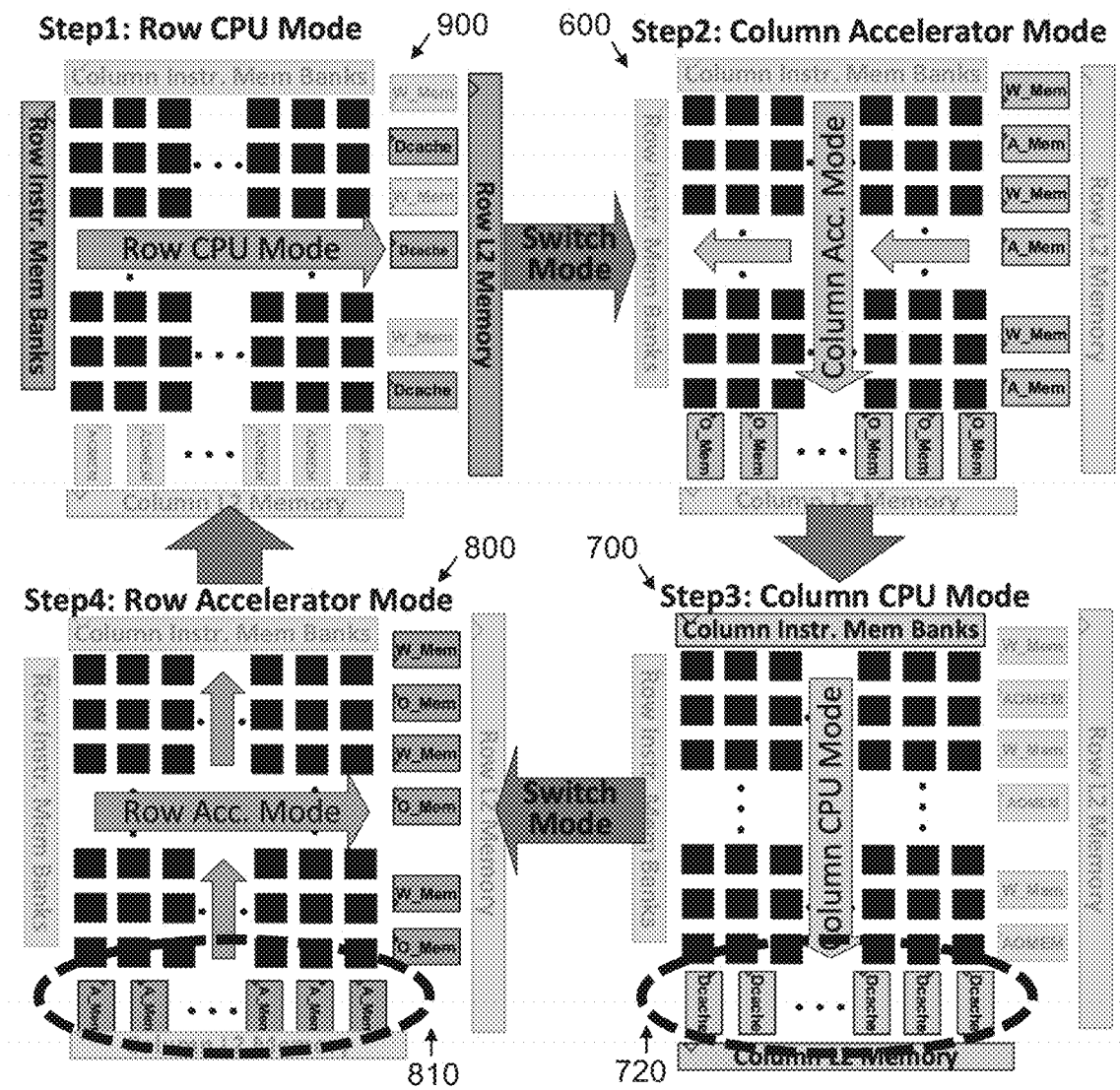
Figure 10F:
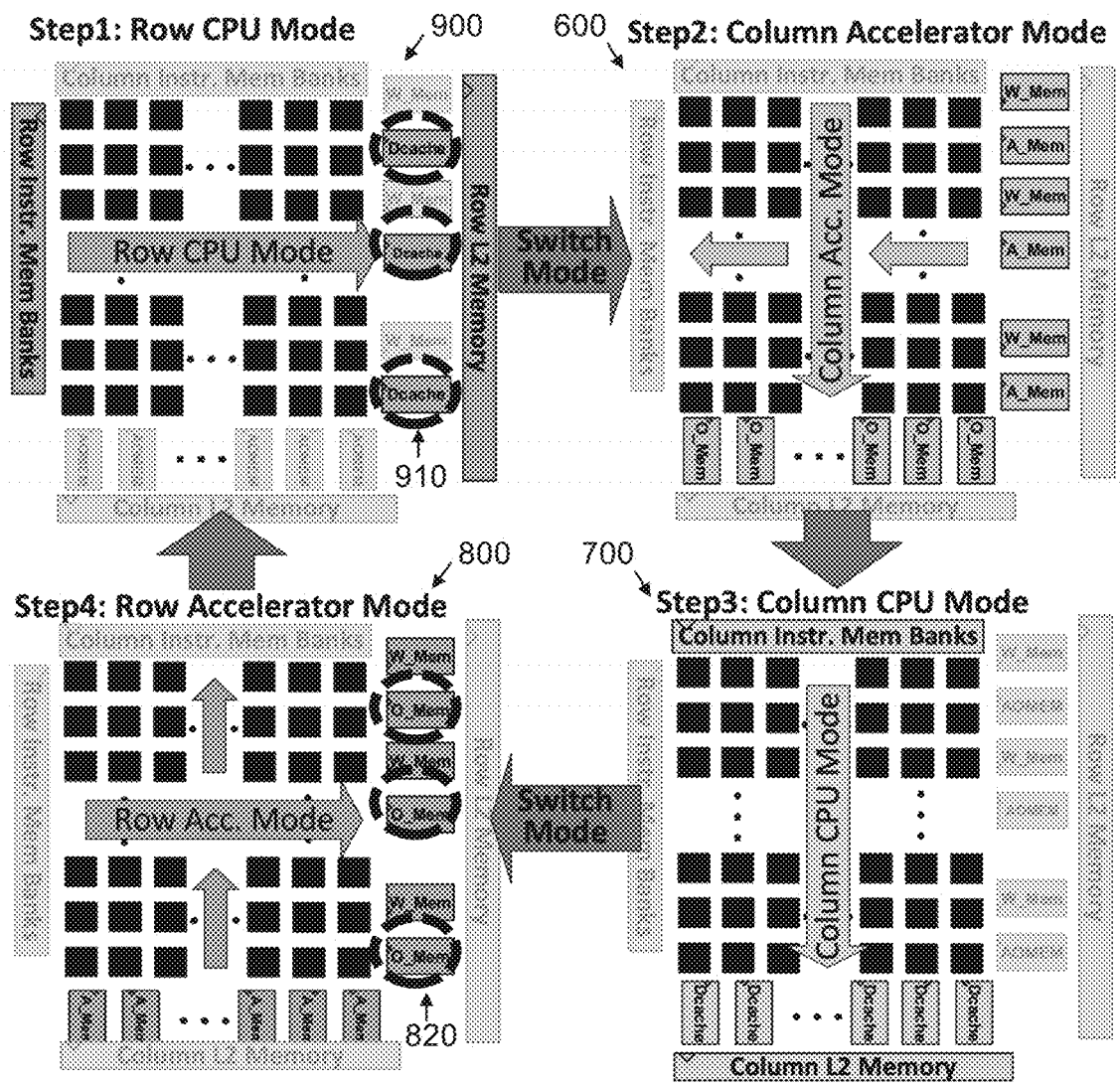

The SNCPU architecture described herein may facilitate a majority of data to be retained inside the processor core, eliminating performing expensive data movement and using the DMA module. To enhance data locality, a special dataflow sequence for CNN operation may be adopted combining the two (2) configurable modes (CPU, accelerator) and two (2) directions (row-based and column-based). Four different resulting configurations for dataflow with activated modules are highlighted in FIGS. 6-9. FIG. 6 is a schematic diagram that illustrates an exemplary reconfigurable systolic array of PEs of an SNCPU 300 reconfigured for a column-accelerator mode dataflow 600. FIG. 7 is a schematic diagram that illustrates an exemplary reconfigurable systolic array of PEs of an SNCPU 300 reconfigured for a column-CPU mode dataflow 700. FIG. 8 is a schematic diagram that illustrates an exemplary reconfigurable systolic array of PEs of an SNCPU 300 reconfigured for a row-accelerator mode dataflow 800. FIG. 9 is a schematic diagram that illustrates an exemplary reconfigurable systolic array of PEs of an SNCPU 300 reconfigured for a row-CPU mode dataflow 900.

The column-accelerator mode dataflow 600 shown in FIG. 6 may be the same as in a conventional weight-stationary systolic array. Each "AOMEM" SRAM bank in every row may be used as input memory 610 and each AOMEM bank in every column may serve as output memory 620 to store accumulated results. Activation 630 may be performed from right to left, input data may go through every PE in each row from right to left, and the accumulation 640 may be performed downward with results passing down in each column from ROW0 to ROW9. Instruction caches may be gated during accelerator mode.

The column-CPU mode dataflow 700 shown in FIG. 7 may pass instructions from top instruction caches 710 downward through the pipeline 715 while the bottom AOMEM banks are reconfigured to data caches 720, which facilitates one column of PEs to be reconfigured into one RISC-V CPU pipeline core.

In the row-accelerator mode 800 shown in FIG. 8, the PEs may receive the inputs from bottom AOMEM banks (configured as input memory 810) and store the results in the right AOMEM banks (configured as output memory 820). The dataflow direction in the row-accelerator mode 800 may be an orthogonal direction dataflow as compared to the column-accelerator mode shown in FIG. 6, with activation 830 going upward in each column from the last row to the first row and accumulation 840 going rightward in each row from the left to the right.

In the row-CPU mode dataflow 900 shown in FIG. 9, every row may be configured as a 5-stage pipelined core, with every row's AOMEM banks serving as data cache 910. Instructions may be passed through the pipeline 920 from left to right.

FIGS. 10A-10F illustrate a four-phase (4-phase) dataflow utilizing the four dataflow configurations of an SNCPU 300 described with reference to FIGS. 6-9 for end-to-end image classification tasks. In a conventional architecture, the DMA engine may be used to transfer input data from a CPU cache to a scratch pad of the accelerator; however, this use of the DMA engine to transfer data may be avoided in the 4-phase dataflow of the SNCPU 300 described herein.

In a first phase Step1, the SNCPU 300 may operate in row-CPU mode dataflow 900 to perform CPU pre-processing/inter-layer data processing including input-data preprocessing (e.g., image reshape, rotation, normalization, grayscale) for the CNN. In a second phase Step2, the SNCPU 300 may operate in column-accelerator mode dataflow 600 to perform DNN 1st layer (L1) processing with the data caches 910 from the first-phase CPU mode reused as input memory 610 for the second-phase CNN accelerator mode. In a third phase Step3, after the CNN accelerator finishes the entire layer of the CNN model, the SNCPU 300 may be reconfigured to column-CPU mode dataflow 700 to perform inter-layer data processing including data alignment, padding, duplication, and post-processing by directly using the data from the output memory 620 from the second-phase accelerator mode as already present in the data caches 720 of the third-phase CPU mode. In a fourth phase Step4, the SNCPU 300 may switch to row-accelerator mode dataflow 800 to perform DNN 2nd layer (L2) processing to process the second layer of the CNN by directly using the data from the data caches 720 of the third-phase CPU mode as already present in the input memory 810 of the fourth-phase accelerator mode. The 4-phase sequence of operations may repeat through the cycle from Step1, to Step2, to Step3, to Step4, and back to Step1 again, etc., until all CNN layers are finished eliminating intermediate data transfer across cores. In addition, as the SNCPU 300 may be configured into ten (10) CPU cores, which together may perform ten (10) separate instructions at the same time, a significant improvement of CPU pre/post-processing may be achieved compared with a conventional CPU+CNN architecture. Using the four-phase cycle described with reference to FIGS. 6, 7, 8, 9 and 10A-10E, keeping data local within the SNCPU 300 while performing bidirectional data flow through the SNCPU 300 combined with reconfiguration of the SNCPU 300 and its PEs to perform different functions in each of four phases in a four-phase cycle eliminates some data transfers that a conventional CPU+CNN architecture performs.

Figure 11A:
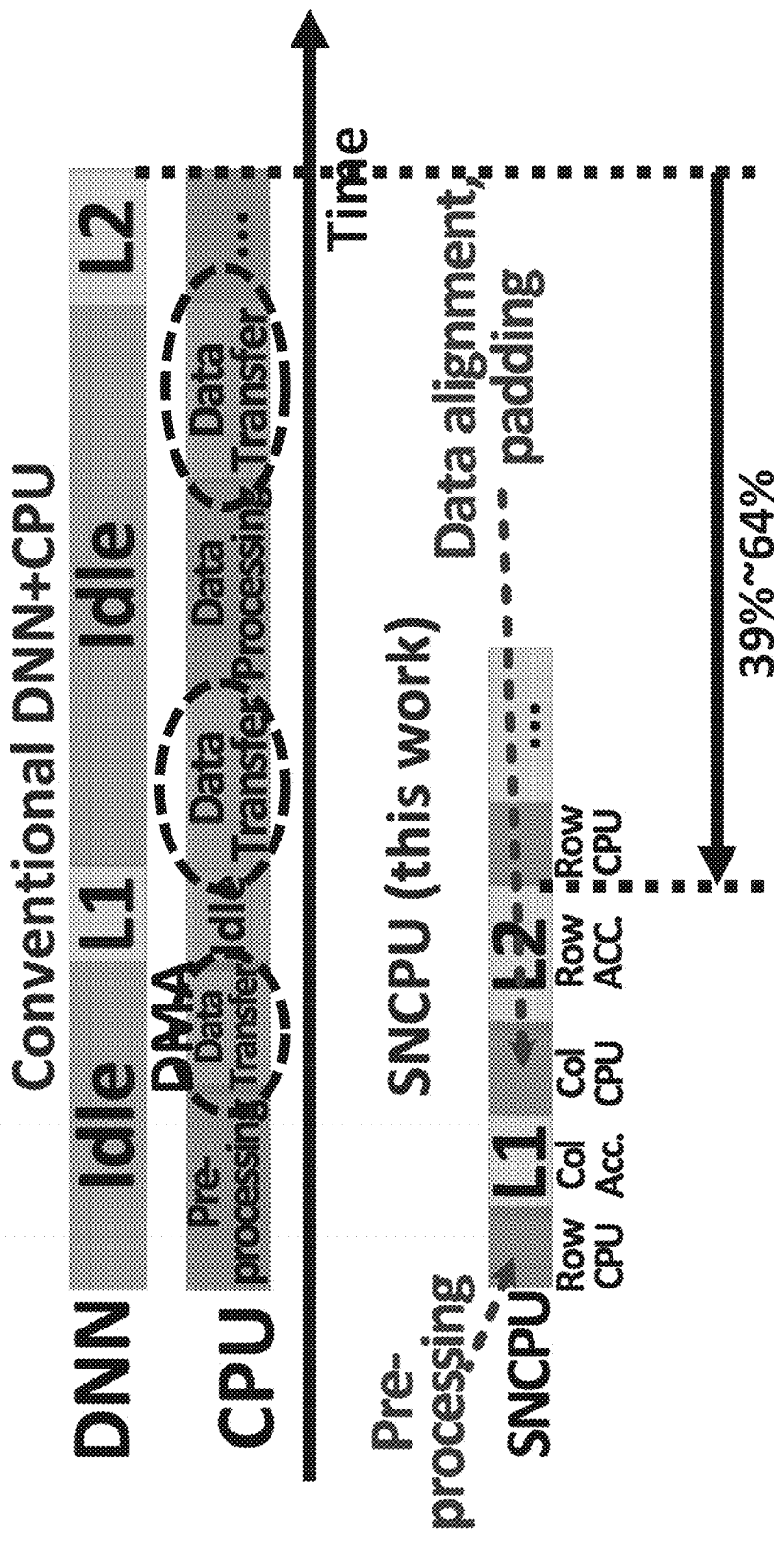
FIGS. 11A-11D are graphs that illustrate end-to-end performance comparisons between exemplary experimental demonstrations of the SNCPU 300 and conventional DNN+ CPU architectures.
Figure 11B:
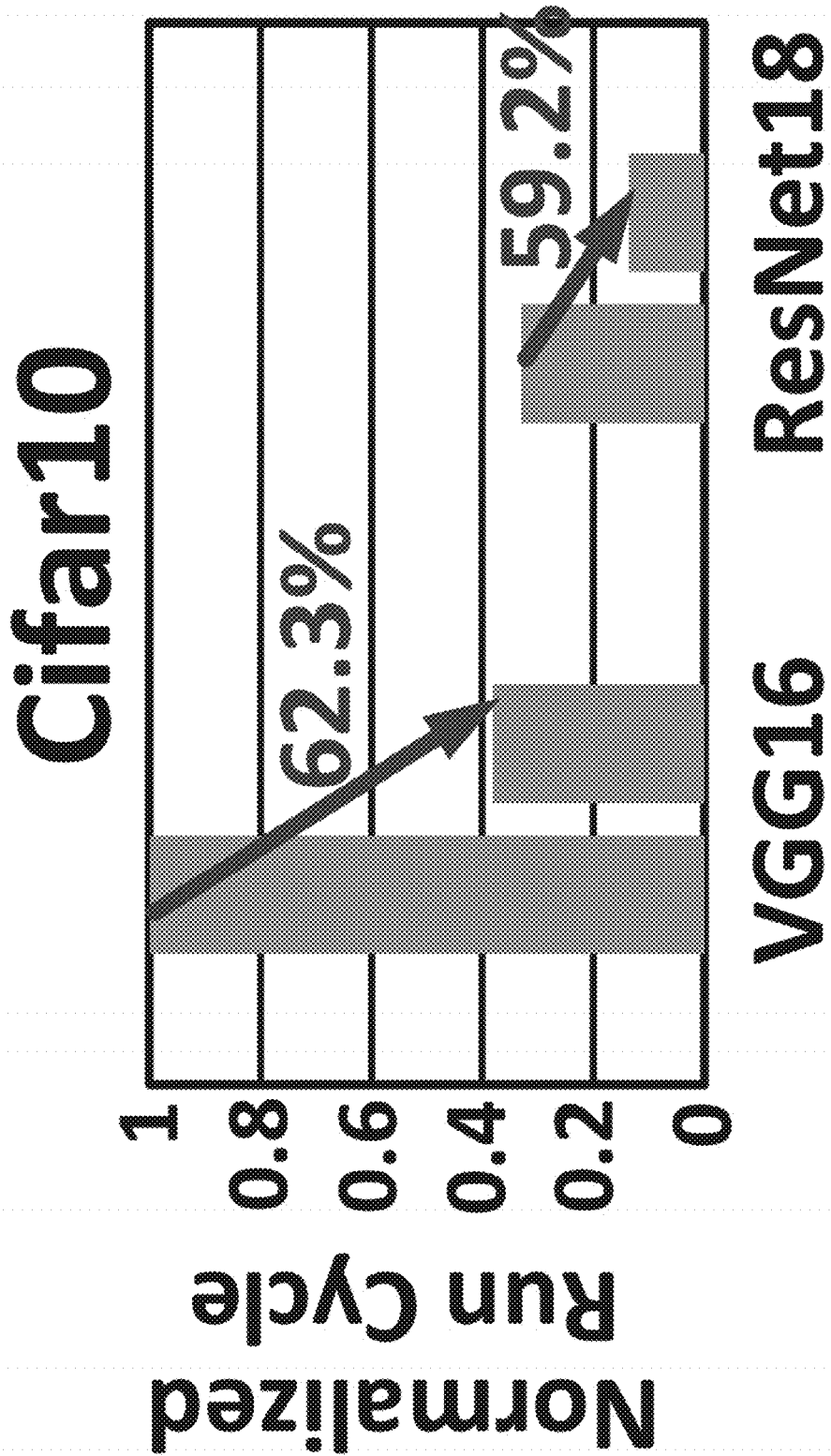
Figure 11C:
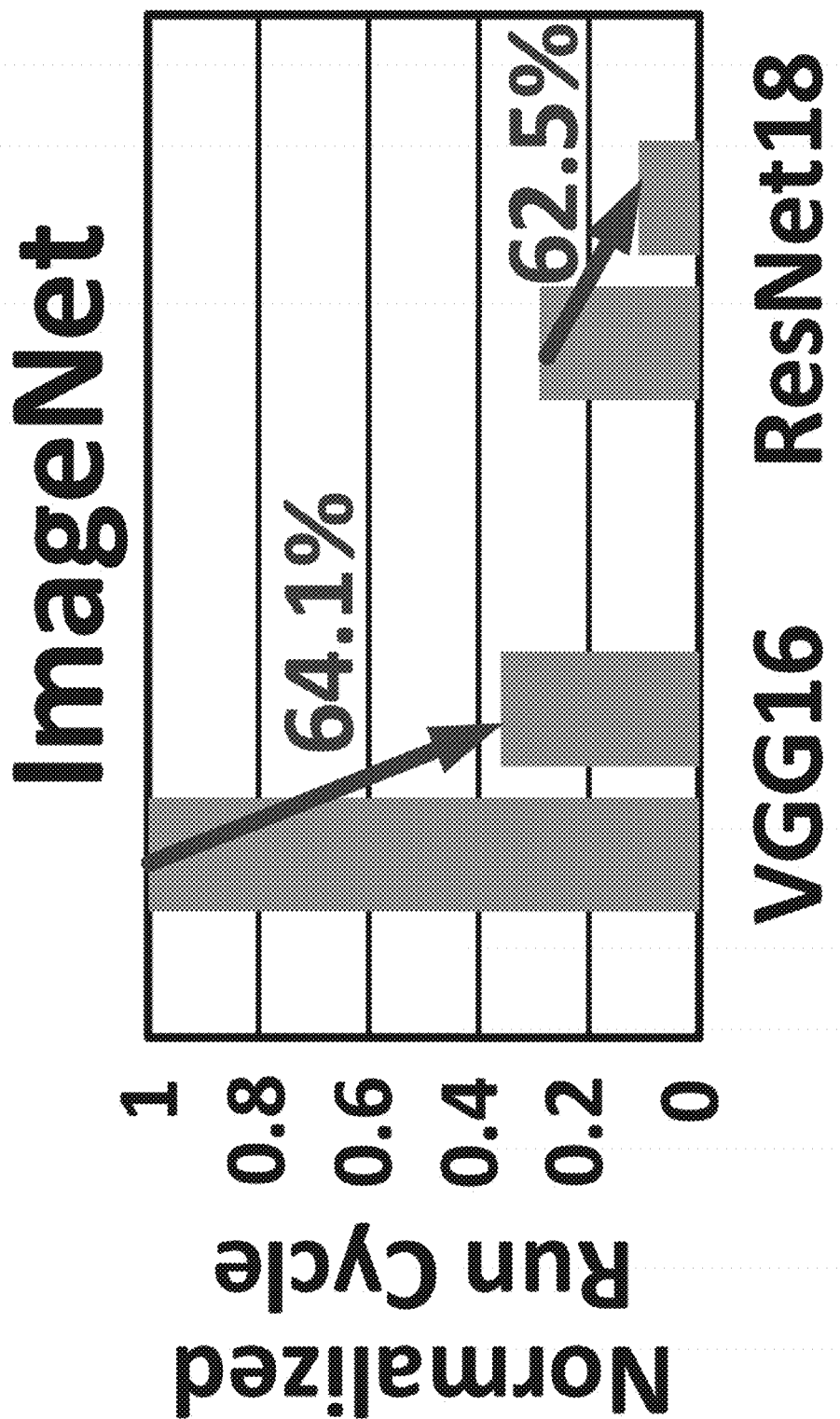
Figure 11D:
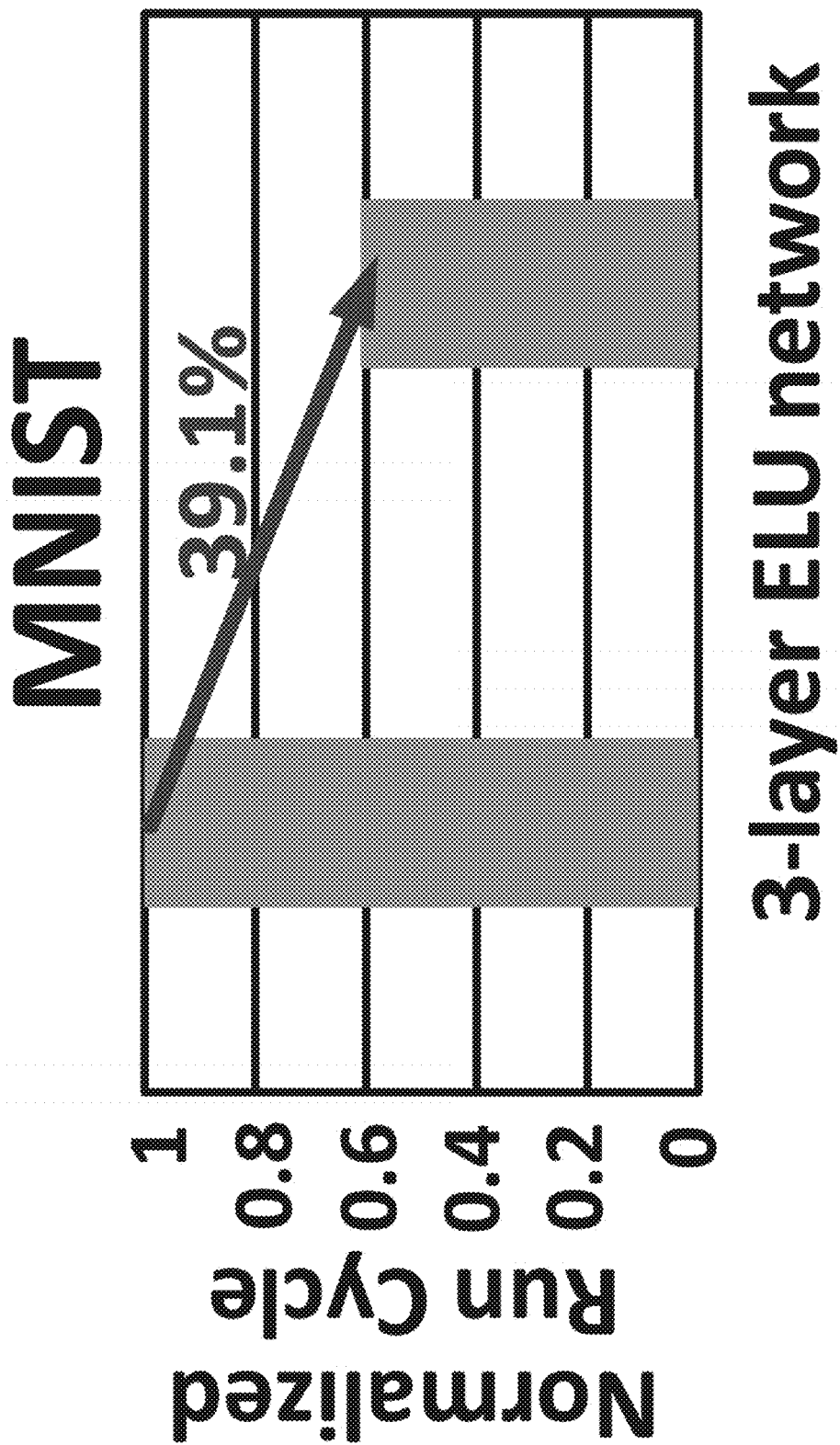

FIGS. 11A-11D are graphs that illustrate end-to-end performance comparisons between exemplary experimental demonstrations of the SNCPU 300 and conventional DNN+CPU architectures. The experimental demonstrations of the SNCPU 300 include implementations of an end-to-end image classification operation using 8b quantized VGG16, ResNet18, 3-layer ELU models on CIFAR10, ImageNet and MNIST datasets. Results show 39%-to-64% improvement in latency compared with a conventional heterogeneous accelerator (DNN+CPU) architecture (e.g., Gemmini). As shown in FIG. 11A, elimination of some idle cycles and elimination of data transfer (e.g., DMA data transfer) of the conventional DNN+CPU architecture by the SNCPU 300 play roles in reducing latency in the SNCPU 300, although the SNCPU 300 does perform pre-processing in the row-CPU phase and performs data alignment and padding in the column-CPU phase. Results show that the 64% latency improvement breaks down as: 33% from 10-core CPU parallel processing and 31% from eliminated data movements. For workloads requiring less CPU or data movements, fewer benefits were observed as in the case for the MNIST dataset.

Figure 12:
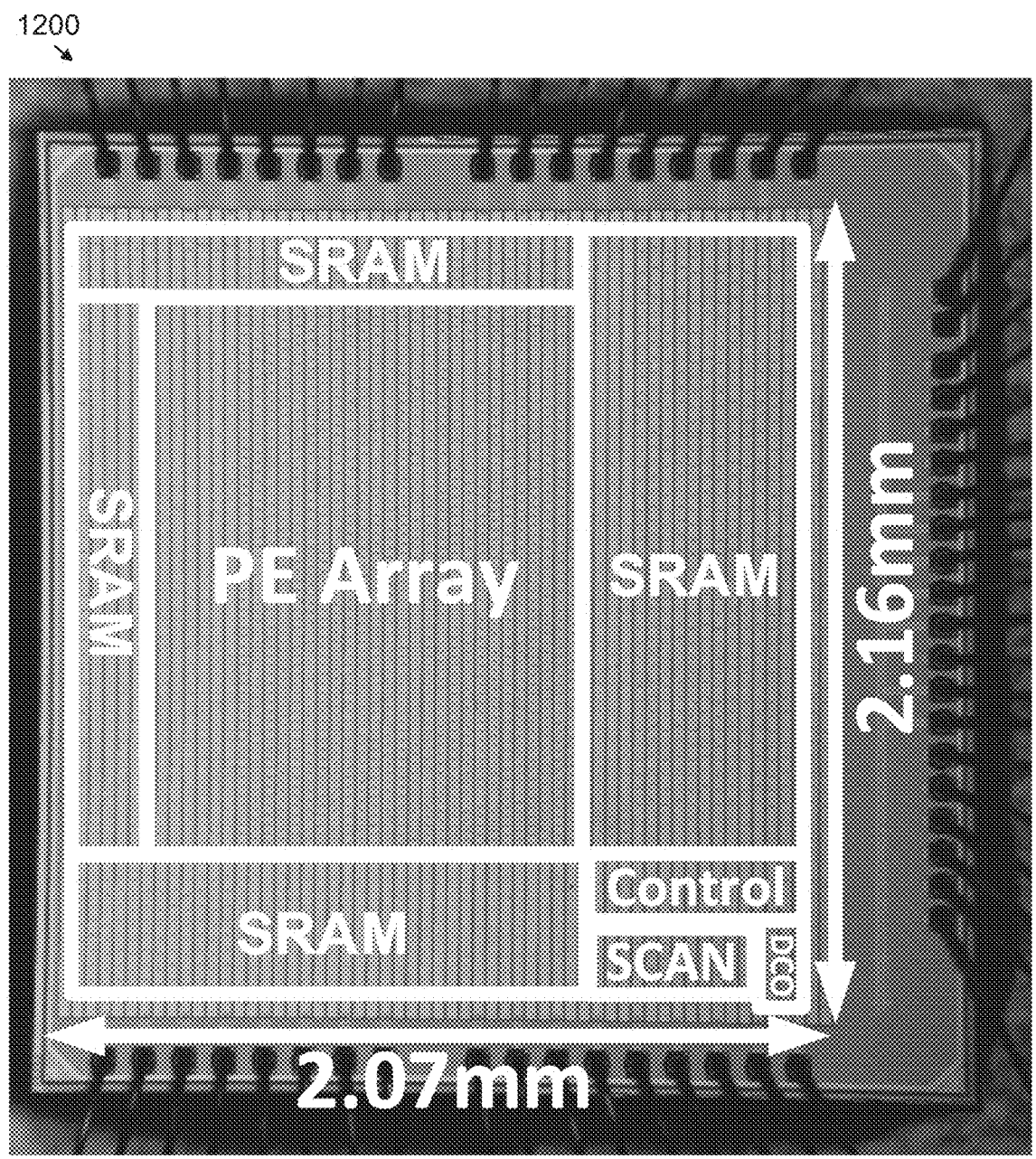
FIG. 12 is a diagram illustrating a floorplan of a 65 nm process technology exemplary SNCPU test chip.

FIG. 12 is a diagram illustrating a floorplan of a 65 nm CMOS process technology exemplary SNCPU test chip 1200. The SNCPU test chip 1200 may be an example of the SNCPU 200 and/or SNCPU 300. The 65 nm SNCPU test chip 1200 was fabricated and tested at a nominal supply of 1.0V. The SNCPU test chip 1200 has dimensions of 2.07 mm by 2.16 mm for an accelerator area of 4.47 mm$^2$. The floorplan of the SNCPU test chip 1200 includes a central PE array block with SRAM blocks on each of four sides of the central PE array block. Additionally, in the lower right corner of the SNCPU test chip 1200 floorplan, a control block, scan block, and DCO block are provided. The PE number is 100, arranged as a 10×10 array of PEs. The 10-core CPU consumes 589 mW, whereas the DNN consumes 116 mW of power. Eight bit integer precision (INT8) is used in this design. The nominal frequency at which the SNCPU test chip 1200 is clocked is 400 MHz. The supply voltage $V_{dd}$ is between 0.5 V and 1 V. An amount of static random access memory (SRAM) provided on the SNCPU test chip 1200 is 150 KB. Energy efficiency is 0.66 to 1.82 TOPS/W at INT8 precision over the supply voltage range from 1 V to 0.5 V.

Figure 13A:
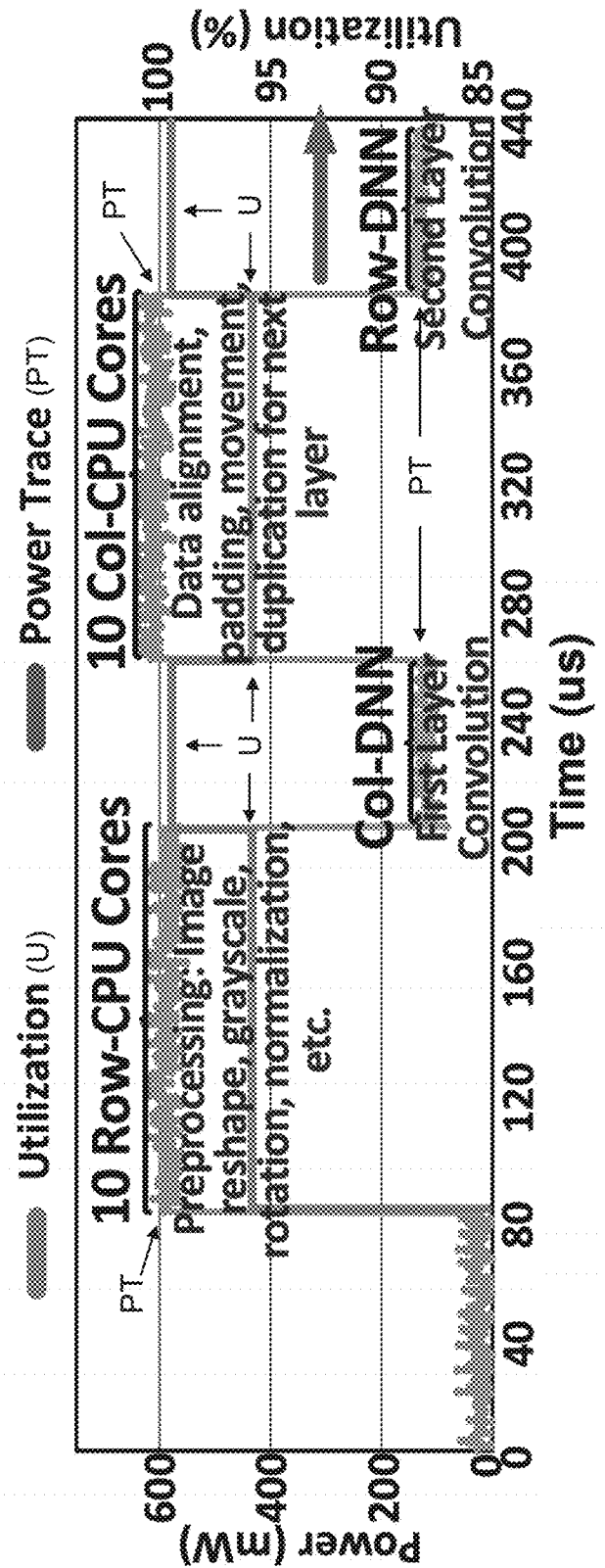
FIGS. 13A-D are graphs that illustrate measurement results of the SNCPU test chip example shown in FIG. 12.

FIGS. 13A-D are graphs that illustrate measurement results of the exemplary SNCPU test chip 1200. FIG. 13A shows a power trace that illustrates the 4-phase operation with continuous core utilization above 95% in both CPU and accelerator mode. As shown in FIG. 13A, power trace is near 0 mW and utilization is near 85% for the first ~80 μs. From ~80 μs to ~200 μs, the SNCPU test chip 1200 is configured as 10 row-CPU cores for preprocessing, such as image reshaping, grayscale, rotation, normalization, and other image processing functions. During this preprocessing, the power trace shows about 600 mW of power consumed while utilization is at about 96%. From ~200 μs to ~260 μs, the SNCPU test chip 1200 is configured in column-DNN mode for performing a first layer convolution. During this column-DNN mode, the power trace shows between about 100-150 mW of power consumed while utilization is at about 99%. From ~260 μs to ~390 μs, the SNCPU test chip 1200 is configured as 10 column-CPU cores for data alignment, padding, movement, and duplication for the next layer. During this column-CPU phase, the power trace shows about 600 mW of power consumed while utilization is at about 96%. From ~390 μs to ~440 μs, the SNCPU test chip 1200 is configured in row-DNN mode for performing a second layer convolution. During this row-DNN mode, the power trace shows between ~100-150 mW of power consumed while utilization is at about 99%.

Figure 13B:
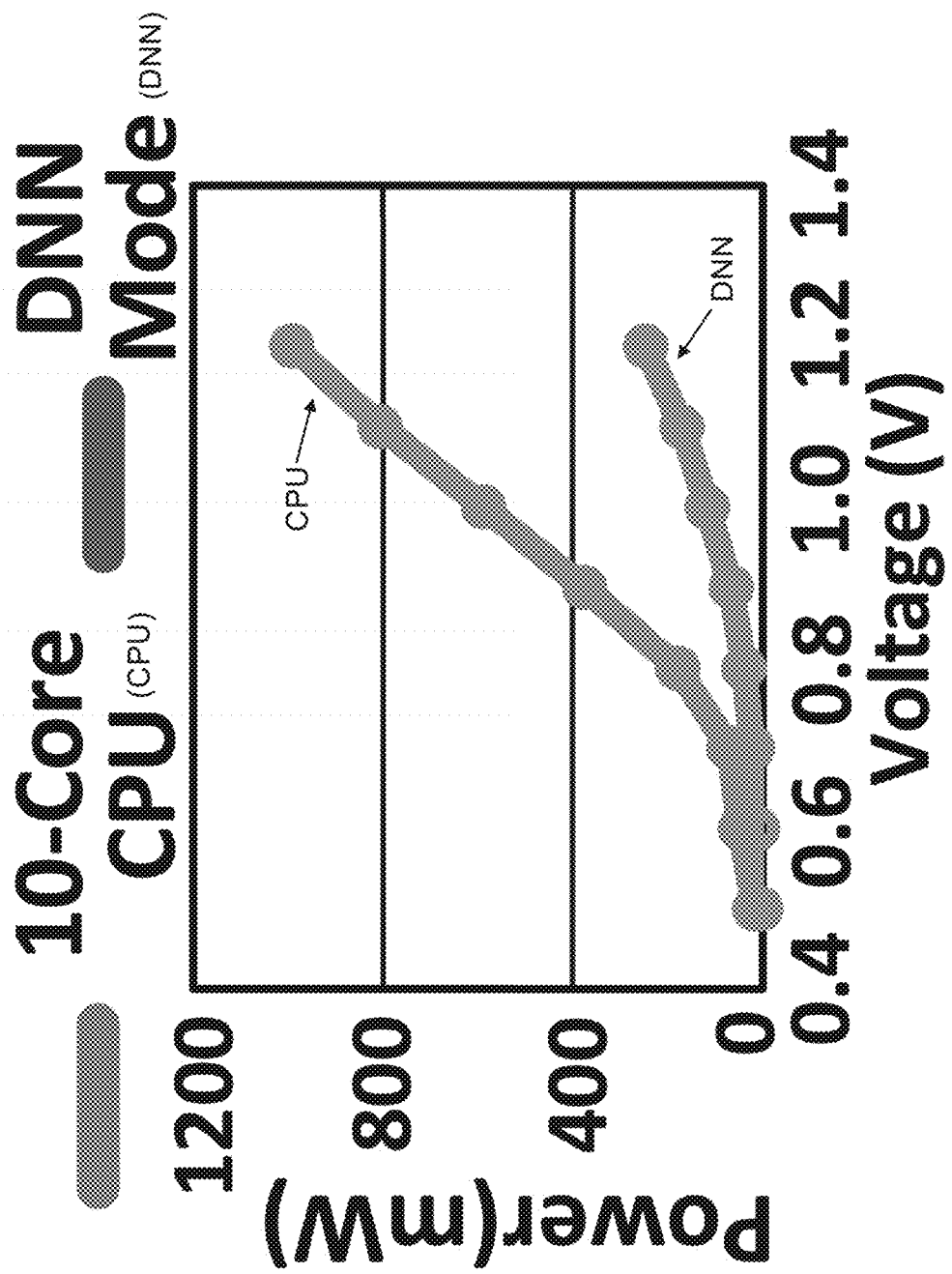

FIG. 13B shows that the 10-core CPU mode consumes up to about 1 W of power as the supply voltage rises from 0.5 V to 1.2 V. In contrast, the DNN mode consumes up to about 300 mW of power as the supply voltage rises over the same range.

Figure 13C:
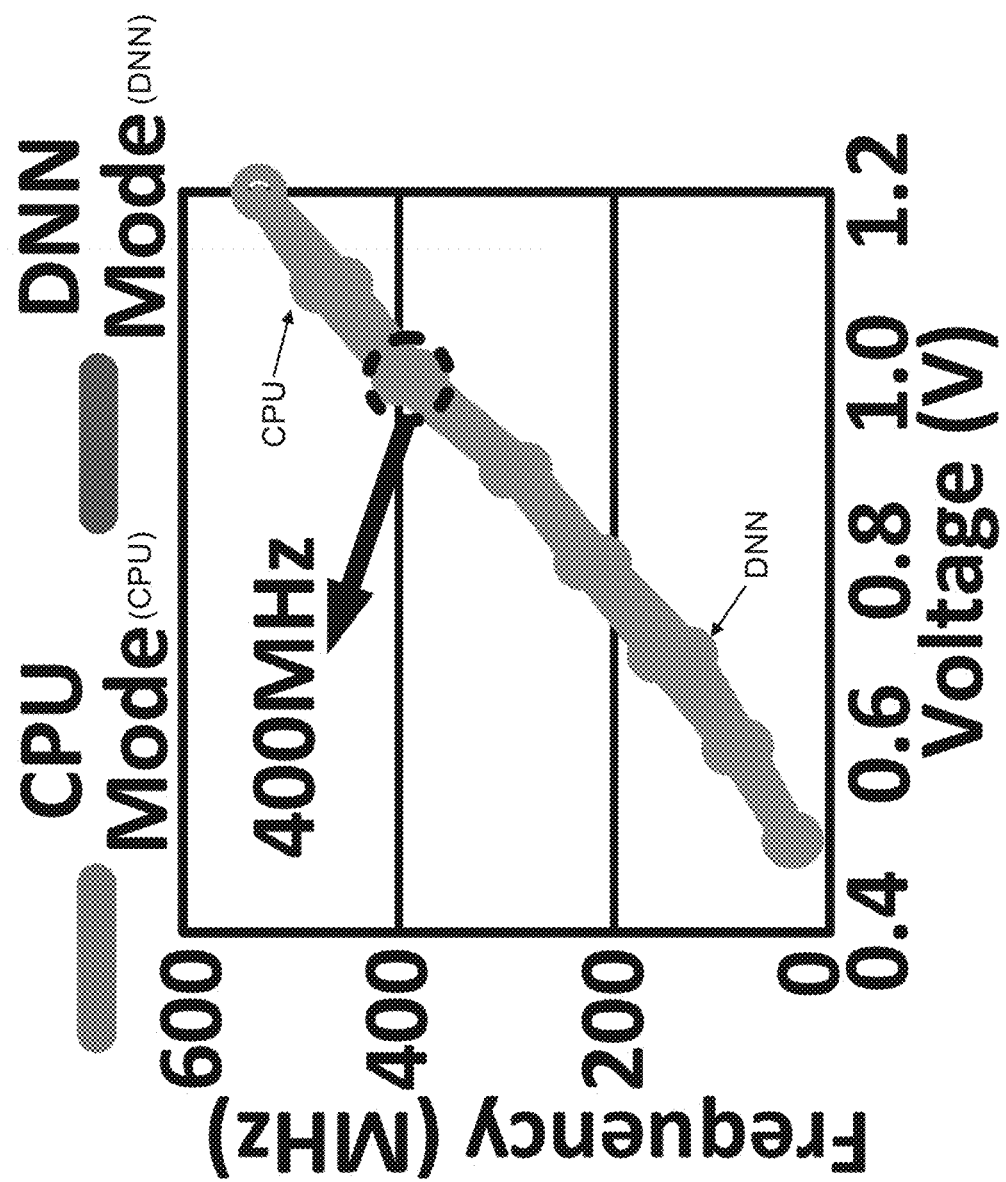

FIG. 13C shows that both CPU mode and DNN mode have a frequency ranging from a little over 0 MHz to 400 MHz as the supply voltage ranges from 0.5 V to 1.0 V, and then up to between about 500 MHz and 550 MHz when the supply voltage rises to 1.2 V.

Figure 13D:
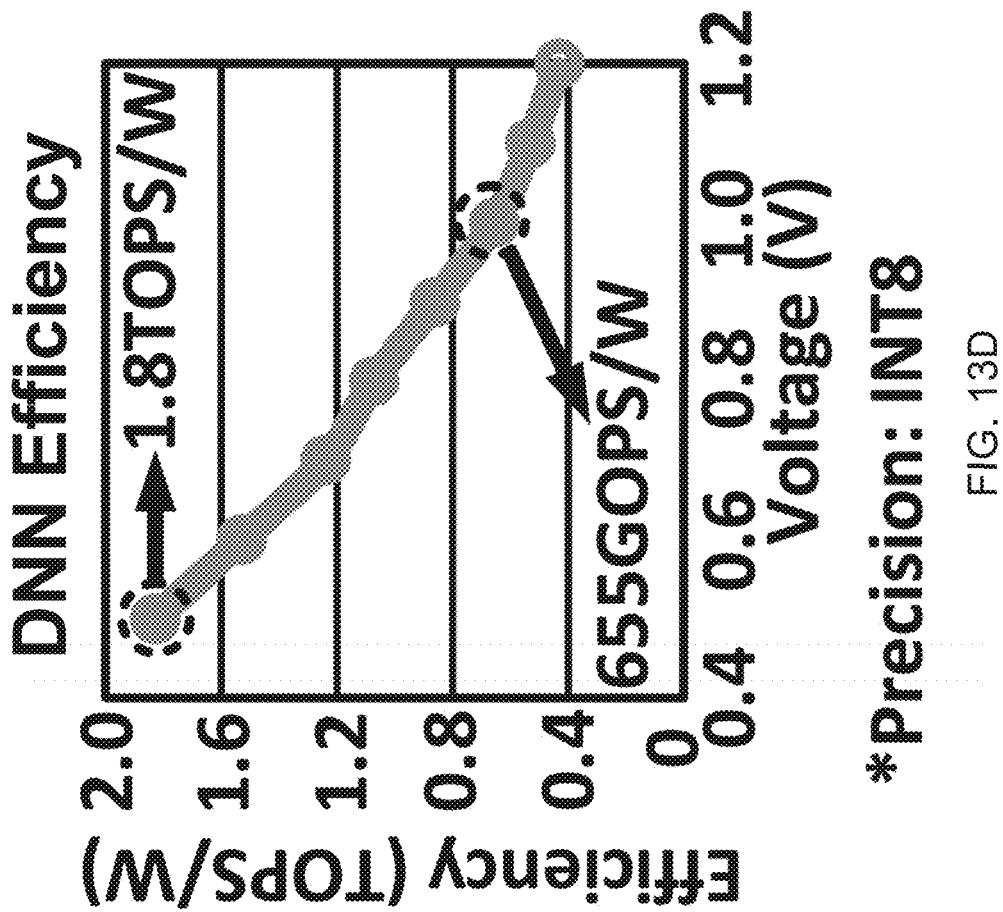

FIG. 13D shows that the DNN energy efficiency drops from about 1.8 TOPS/W to 655 GOPS/W as the supply voltage increases from 0.5 V to 1.0 V, and then decreases further to about 400 GOPS/W as the supply voltage increases further to 1.2 V. These measurements were performed using 8 bit (8b) integer precision. In summary, 0.66-to-1.8 TOPS/W energy efficiency at 8b integer precision for CNN is achieved over the supply voltage range from 1.0 V to 0.5 V.

FIG. 14 is a table that shows a comparison of the exemplary SNCPU test chip 1200 shown in FIG. 12 with prior works. The table shows that the comparisons are made between the different works all fabricated in 65 nm process technology. The comparisons of FIG. 14 show that the SNCPU test chip 1200 has the lowest power consumption at 116 mW (CNN) compared to 241 mW, 278 mW, and 279 mW, respectively, for the other compared works of MICRO2020, Eyeriss, and DNPU.

Compared with a prior reconfigurable binary neural network (BNN)-based design by the inventors in collaboration with others, the SNCPU test chip 1200 described herein converts a commonly used 8b systolic CNN accelerator into 10 CPU cores offering significantly higher performance and a broader set of use cases. In comparison with a conventional CNN+CPU architecture, a latency improvement of 39% to 64% is observed in the SNCPU test chip 1200 described herein.

Figure 15:
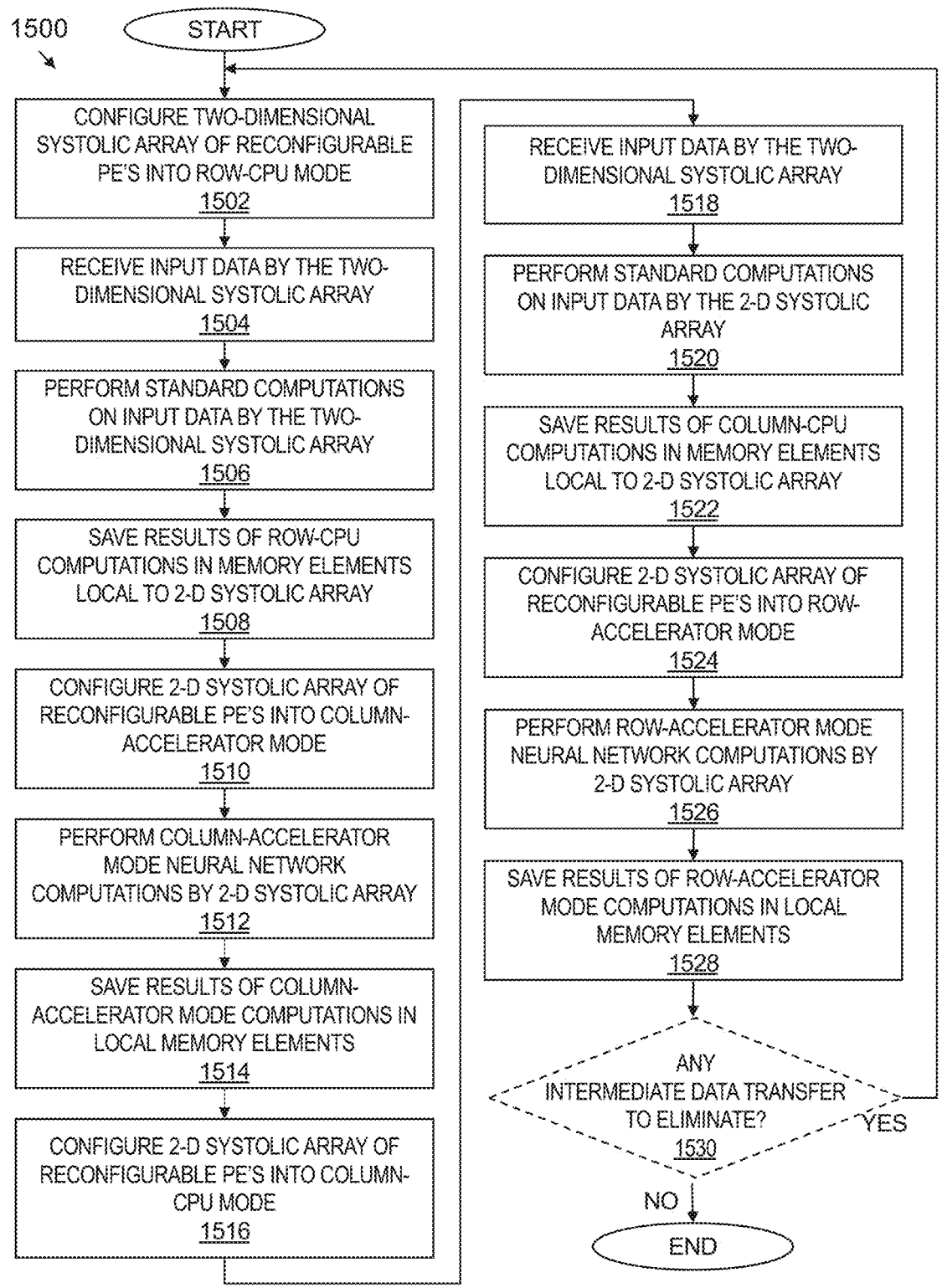
FIG. 15 is a flowchart that illustrates an exemplary process of performing deep neural network processing and computing processing in a two-dimensional systolic array of reconfigurable processing elements.

FIG. 15 is a flowchart that illustrates an exemplary process 1500 of performing deep neural network processing and computing processing in a two-dimensional systolic array of reconfigurable processing elements. In some examples, one or more process blocks of FIG. 15 may be performed by electronic circuitry and/or a computing device.

As shown in FIG. 15, process 1500 may include configuring the two-dimensional systolic array of reconfigurable processing elements (PE's) into a row-CPU mode where the two-dimensional systolic array is configured to perform standard computations on input data (block 1502). For example, electronic circuitry and/or a computing device may configure the two-dimensional systolic array of reconfigurable processing elements into a row-CPU mode where the two-dimensional systolic array is configured to perform standard computations on input data, as described above.

As also shown in FIG. 15, process 1500 may include receiving input data by the two-dimensional systolic array configured into row-CPU mode (block 1504). For example, electronic circuitry and/or a computing device may receive input data by the two-dimensional systolic array configured into row-CPU mode, as described above.

As further shown in FIG. 15, process 1500 may include performing standard computations on the input data by the two-dimensional systolic array (block 1506). For example, electronic circuitry and/or a computing device may perform standard computations on the input data by the two-dimensional systolic array, as described above.

As also shown in FIG. 15, process 1500 may include saving results of the row-CPU computations in memory elements local to the two-dimensional systolic array (block 1508). For example, electronic circuitry and/or a computing device may save results of the row-CPU computations in memory elements local to the two-dimensional systolic array, as described above.

As further shown in FIG. 15, process 1500 may include configuring the two-dimensional systolic array of reconfigurable processing elements into a column-accelerator mode where the two-dimensional systolic array is configured to perform deep neural network processing on input data (block 1510). For example, electronic circuitry and/or a computing device may configure the two-dimensional systolic array of reconfigurable processing elements into a column-accelerator mode where the two-dimensional systolic array is configured to perform deep neural network processing on input data, as described above.

As also shown in FIG. 15, process 1500 may include performing column-accelerator mode neural network computations starting from the results from the row-CPU mode computations in the local memory elements where the results were saved as input data by the two-dimensional systolic array configured into column-accelerator mode (block 1512). For example, electronic circuitry and/or a computing device may perform column-accelerator mode neural network computations starting from the results from the row-CPU mode computations in the local memory elements where the results were saved as input data by the two-dimensional systolic array configured into column-accelerator mode, as described above.

As further shown in FIG. 15, process 1500 may include saving results of the column-accelerator mode neural network computations in memory elements local to the two-dimensional systolic array (block 1514). For example, electronic circuitry and/or a computing device may save results of the column-accelerator mode neural network computations in memory elements local to the two-dimensional systolic array, as described above.

As also shown in FIG. 15, process 1500 may include configuring the two-dimensional systolic array of reconfigurable processing elements into a column-CPU mode where the two-dimensional systolic array is configured to perform standard computations on input data (block 1516). For example, electronic circuitry and/or a computing device may configure the two-dimensional systolic array of reconfigurable processing elements into a column-cpu mode where the two-dimensional systolic array is configured to perform standard computations on input data, as described above.

As further shown in FIG. 15, process 1500 may include receiving input data by the two-dimensional systolic array configured into column-CPU mode (block 1518). For example, electronic circuitry and/or a computing device may receive input data by the two-dimensional systolic array configured into column-CPU mode, as described above.

As also shown in FIG. 15, process 1500 may include performing standard computations on the input data by the two-dimensional systolic array (block 1520). For example, electronic circuitry and/or a computing device may perform standard computations on the input data by the two-dimensional systolic array, as described above.

As further shown in FIG. 15, process 1500 may include saving results of the column-CPU computations in memory elements local to the two-dimensional systolic array (block 1522). For example, electronic circuitry and/or a computing device may save results of the column-CPU computations in memory elements local to the two-dimensional systolic array, as described above.

As also shown in FIG. 15, process 1500 may include configuring the two-dimensional systolic array of reconfigurable processing elements into a row-accelerator mode where the two-dimensional systolic array is configured to perform deep neural network processing on input data (block 1524). For example, electronic circuitry and/or a computing device may configure the two-dimensional systolic array of reconfigurable processing elements into a row-accelerator mode where the two-dimensional systolic array is configured to perform deep neural network processing on input data, as described above.

As further shown in FIG. 15, process 1500 may include performing row-accelerator mode neural network computations starting from the results from the column-CPU mode computations in the local memory elements where the results were saved as input data by the two-dimensional systolic array configured into row-accelerator mode (block 1526). For example, electronic circuitry and/or a computing device may perform row-accelerator mode neural network computations starting from the results from the column-CPU mode computations in the local memory elements where the results were saved as input data by the two-dimensional systolic array configured into row-accelerator mode, as described above.

As also shown in FIG. 15, process 1500 may include saving results of the row-accelerator mode neural network computations in memory elements local to the two-dimensional systolic array (block 1528). For example, electronic circuitry and/or a computing device may save results of the row-accelerator mode neural network computations in memory elements local to the two-dimensional systolic array, as described above.

Process 1500 may include additional exemplary operations, such as any single exemplary operation or any combination of exemplary operations described below and/or in connection with one or more other processes described elsewhere herein. In a first additional example, process 1500 further includes determining if any neural network layers of the two-dimensional systolic array have any intermediate data transfer across cores remaining to be eliminated, and while intermediate data transfer across cores remains to be eliminated, continuing cycling through operations of the process 1500 in a circular sequence from row-CPU mode operations, to column-accelerator mode operations, to column-CPU mode operations, and to row-accelerator mode operations (block 1530).

In a second additional example, alone or in combination with the first additional example, process 1500 may include causing data to flow in a direction during the row-accelerator mode neural network computations that is orthogonal to a direction data flows during the column-accelerator mode neural network computations.

In a third additional example, alone or in combination with the first and second additional examples of process 1500, performing neural network computations may include performing systolic dataflow with weight-stationary operations, and performing standard computations by the two-dimensional systolic array may include performing computations by a sequence of RISC-V pipeline stages configured from the processing elements of the two-dimensional systolic array.

Although FIG. 15 shows example blocks of process 1500, in some examples, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
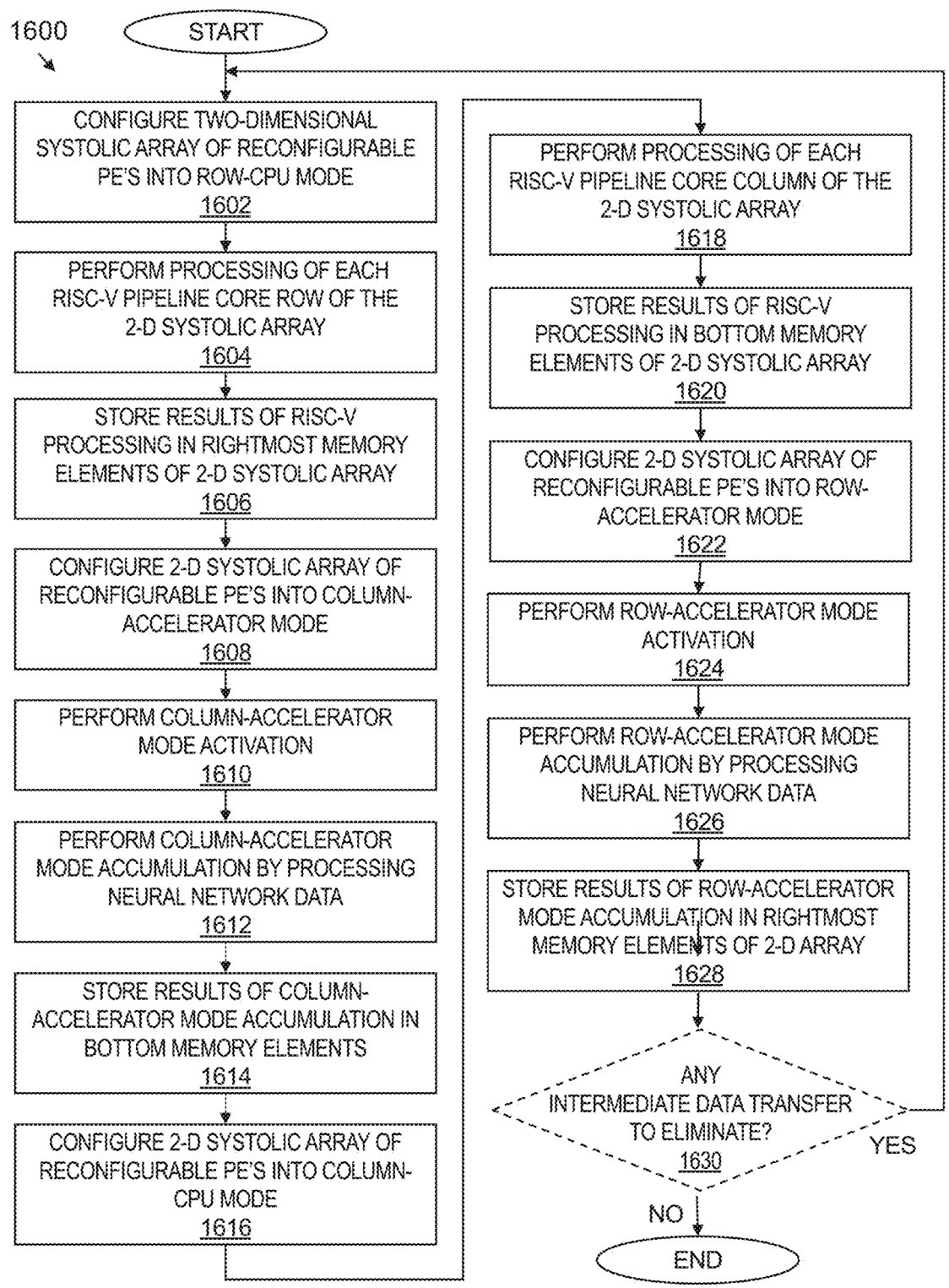
FIG. 16 is a flowchart that illustrates an exemplary process of performing deep neural network processing and computing processing in a two-dimensional systolic array of reconfigurable processing elements.

FIG. 16 is a flowchart that illustrates an exemplary process 1600 of performing deep neural network processing and computing processing in a two-dimensional systolic array of reconfigurable processing elements. In some examples, one or more process blocks of FIG. 16 may be performed by electronic circuitry and/or a computing device.

As shown in FIG. 16, process 1600 may include configuring the two-dimensional systolic array of reconfigurable processing elements into a row-CPU mode where each row of the two-dimensional systolic array includes a RISC-V pipeline core (block 1602). For example, electronic circuitry and/or a computing device may configure the two-dimensional systolic array of reconfigurable processing elements into a row-CPU mode where each row of the two-dimensional systolic array includes a RISC-V pipeline core, as described above.

As also shown in FIG. 16, process 1600 may include performing computing processing of each RISC-V pipeline core row from a leftmost column toward a rightmost column of the two-dimensional systolic array (block 1604). For example, electronic circuitry and/or a computing device may perform computing processing of each RISC-V pipeline core row from a leftmost column toward a rightmost column of the two-dimensional systolic array, as described above.

As further shown in FIG. 16, process 1600 may include storing results of the RISC-V pipeline core row processing in a right set of memory elements to the right of the rightmost column of the two-dimensional systolic array (block 1606). For example, electronic circuitry and/or a computing device may store results of the RISC-V pipeline core row processing in a right set of memory elements to the right of the rightmost column of the two-dimensional systolic array, as described above.

As also shown in FIG. 16, process 1600 may include configuring the two-dimensional systolic array of reconfigurable processing elements into a column-accelerator mode where the reconfigurable processing elements are configured as DNN processing elements (block 1608). For example, electronic circuitry and/or a computing device may configure the two-dimensional systolic array of reconfigurable processing elements into a column-accelerator mode where the reconfigurable processing elements are configured as DNN processing elements, as described above.

As further shown in FIG. 16, process 1600 may include performing column-accelerator mode activation by processing neural network data flowing from the right set of memory elements on the rightmost side of the rows of the two-dimensional systolic array leftward toward a leftmost column of the two-dimensional systolic array (block 1610). For example, electronic circuitry and/or a computing device may perform column-accelerator mode activation by processing neural network data flowing from the right set of memory elements on the rightmost side of the rows of the two-dimensional systolic array leftward toward a leftmost column of the two-dimensional systolic array, as described above.

As also shown in FIG. 16, process 1600 may include performing column-accelerator mode accumulation by processing neural network data flowing from the topmost row of the two-dimensional systolic array toward a bottom set of memory elements below the bottommost row of the two-dimensional systolic array (block 1612). For example, electronic circuitry and/or a computing device may perform column-accelerator mode accumulation by processing neural network data flowing from the topmost row of the two-dimensional systolic array toward a bottom set of memory elements below the bottommost row of the two-dimensional systolic array, as described above.

As further shown in FIG. 16, process 1600 may include storing results of the column-accelerator mode accumulation in the bottom set of memory elements below the bottommost row of the two-dimensional systolic array (block 1614). For example, electronic circuitry and/or a computing device may store results of the column-accelerator mode accumulation in the bottom set of memory elements below the bottommost row of the two-dimensional systolic array, as described above.

As also shown in FIG. 16, process 1600 may include configuring the two-dimensional systolic array of reconfigurable processing elements into a column-CPU mode where each column of the two-dimensional systolic array includes a RISC-V pipeline core (block 1616). For example, electronic circuitry and/or a computing device may configure the two-dimensional systolic array of reconfigurable processing elements into a column-CPU mode where each column of the two-dimensional systolic array includes a RISC-V pipeline core, as described above.

As further shown in FIG. 16, process 1600 may include performing computing processing of each RISC-V pipeline core column from a topmost row toward a bottommost row of the two-dimensional systolic array (block 1618). For example, electronic circuitry and/or a computing device may perform computing processing of each RISC-V pipeline core column from a topmost row toward a bottommost row of the two-dimensional systolic array, as described above.

As also shown in FIG. 16, process 1600 may include storing results of the RISC-V pipeline core column processing in the bottom set of memory elements below the bottommost row of the two-dimensional systolic array (block 1620). For example, electronic circuitry and/or a computing device may store results of the RISC-V pipeline core column processing in the bottom set of memory elements below the bottommost row of the two-dimensional systolic array, as described above.

As further shown in FIG. 16, process 1600 may include configuring the two-dimensional systolic array of reconfigurable processing elements into a row-accelerator mode where the reconfigurable processing elements are configured as DNN processing elements (block 1622). For example, electronic circuitry and/or a computing device may configure the two-dimensional systolic array of reconfigurable processing elements into a row-accelerator mode where the reconfigurable processing elements are configured as DNN processing elements, as described above.

As also shown in FIG. 16, process 1600 may include performing row-accelerator mode activation by processing neural network data flowing from the bottom set of memory elements below the bottommost row of the two-dimensional systolic array upward toward a topmost row of the two-dimensional systolic array (block 1624). For example, electronic circuitry and/or a computing device may perform row-accelerator mode activation by processing neural network data flowing from the bottom set of memory elements below the bottommost row of the two-dimensional systolic array upward toward a topmost row of the two-dimensional systolic array, as described above.

As further shown in FIG. 16, process 1600 may include performing row-accelerator mode accumulation by processing neural network data flowing from the leftmost column of the two-dimensional systolic array toward the right set of memory elements to the right of the rightmost column of the two-dimensional systolic array (block 1626). For example, electronic circuitry and/or a computing device may perform row-accelerator mode accumulation by processing neural network data flowing from the leftmost column of the two-dimensional systolic array toward the right set of memory elements to the right of the rightmost column of the two-dimensional systolic array, as described above.

As also shown in FIG. 16, process 1600 may include storing results of the row-accelerator mode accumulation in the right set of memory elements to the right of the rightmost column of the two-dimensional systolic array (block 1628). For example, electronic circuitry and/or a computing device may store results of the row-accelerator mode accumulation in the right set of memory elements to the right of the rightmost column of the two-dimensional systolic array, as described above.

Process 1600 may include additional exemplary operations, such as any single operation or any combination of operations described below and/or in connection with one or more other processes described elsewhere herein. In a first additional example, process 1600 may include sending data stored in the right set of memory elements at a conclusion of a most recently completed row-accelerator mode accumulation process to corresponding register files of the respective RISC-V pipeline core rows and processing the sent data provided to the execution stage of the RISC-V pipeline core rows by the corresponding register files.

In a second additional example, alone or in combination with the first additional example, process 1600 may include sending data stored in the bottom set of memory elements at a conclusion of a most recently completed column-accelerator mode accumulation process to corresponding register files of the respective RISC-V pipeline core columns and processing the sent data provided to the execution stage of the RISC-V pipeline core columns by the corresponding register files.

In a third additional example, alone or in combination with the first and/or second additional examples, process 1600 may include using data stored in the bottom set of memory elements at a conclusion of a most recently completed column-CPU mode computing process as input data to the respective row-accelerator mode columns.

A fourth additional example, alone or in combination with one or more of the first through third additional examples, process 1600 may include using data stored in the right set of memory elements at a conclusion of a most recently completed row-CPU mode computing process as input data to the respective column-accelerator mode rows.

A fifth additional example, alone or in combination with one or more of the first through fourth additional examples, process 1600 further includes determining if any neural network layers of the two-dimensional systolic array have any intermediate data transfer across cores remaining to be eliminated, and while intermediate data transfer across cores remains to be eliminated, continuing cycling through operations of the process 1600 in a circular sequence from row-CPU mode operations, to column-accelerator mode operations, to column-CPU mode operations, and to row-accelerator mode operations (block 1630).

Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An electronic circuit comprising:
   a two-dimensional systolic array of reconfigurable processing elements, the reconfigurable processing elements communicatively coupled with neighboring reconfigurable processing elements for bidirectional communications;
   a plurality of memory units communicatively coupled with corresponding reconfigurable processing units at an outer edge of the two-dimensional systolic array, the plurality of memory units configured for bidirectional communications with the corresponding reconfigurable processing units;
   a plurality of accumulator modules, each of the plurality of accumulator modules communicatively coupled with at least one reconfigurable processing element and memory unit of a row or column of the two-dimensional systolic array; and
   a plurality of instruction caches, each of the plurality of instruction caches communicatively coupled with a reconfigurable processing element at an edge of a row or a column of the two-dimensional systolic array;
   wherein a row of the two-dimensional systolic array of reconfigurable processing elements is configurable into a first deep neural network (DNN) accumulator at a first time and configurable into a first central processing unit (CPU) pipeline at a second time; and
   wherein a column of the two-dimensional systolic array of reconfigurable processing elements is configurable into a second deep neural network (DNN) accumulator at a third time and configurable into a second CPU pipeline at a fourth time.

2. The electronic circuit of claim 1, wherein the first CPU pipeline and the second CPU pipeline each comprise:
   a first reconfigurable processing element configured into a program counter (PC) register;
   a second and a third reconfigurable processing element configured together into an instruction fetch (IF) stage;
   a fourth and a fifth reconfigurable processing element each configured into a different instruction decoder for an instruction decoding (ID) stage;
   a sixth reconfigurable processing element configured into an arithmetic logic unit (ALU) of an execution (EX) stage;
   a seventh reconfigurable processing element configured into a branch unit of the EX stage;
   an eighth reconfigurable processing element configured into Boolean logic for functions of the ALU of the EX stage;
   a ninth reconfigurable processing element configured into a memory register (MEM) stage; and
   a tenth reconfigurable processing element configured into a write-back (WB) stage.

3. The electronic circuit of claim 2, wherein the first CPU pipeline and the second CPU pipeline each further comprise a register file (RF) communicatively coupled to receive data from the reconfigurable processing elements of the ID stage and the WB stage, and to send data to the EX stage.

4. The electronic circuit of claim 2, wherein the first CPU pipeline and the second CPU pipeline are each configured as a Reduced Instruction Set Computer-Five (RISC-V) CPU pipeline.

5. The electronic circuit of claim 1, further comprising:
   a row level-two memory unit communicatively coupled with a first subset of the plurality of memory units at one end of the rows of the two-dimensional systolic array of reconfigurable processing elements, the row level-two memory unit configured for bidirectional communications with the first subset of the plurality of memory units; and
   a column level-two memory unit communicatively coupled with a second subset of the plurality of memory units at one end of the columns of the two-dimensional systolic array of reconfigurable processing elements, the column level-two memory unit configured for bidirectional communications with the second subset of the plurality of memory units.

6. The electronic circuit of claim 1, further comprising a plurality of register files, each of the plurality of register files communicatively coupled with at least one of the plurality of reconfigurable processing elements of a corresponding row or column of the two-dimensional systolic array, the plurality of register files configured for bidirectional communications with the corresponding reconfigurable processing units.

7. The electronic circuit of claim 1, wherein the plurality of accumulator modules are configured to provide, when their respective row or column of the two-dimensional systolic array of reconfigurable processing elements is configured as a DNN accumulator, single instruction, multiple data (SIMD) support for at least one function selected from group consisting of pooling, rectified linear unit (ReLU) functionality, and accumulation.

8. The electronic circuit of claim 1, wherein the two-dimensional systolic array of reconfigurable processing elements comprises ten reconfigurable processing elements in each dimension.

9. The electronic circuit of claim 1, wherein the two-dimensional systolic array of reconfigurable processing elements is reconfigurable into four modes:
   a row-CPU mode wherein each row of the two-dimensional systolic array includes a Reduced Instruction Set Computer-Five (RISC-V) pipeline core that processes data from a left column toward a rightmost column of the two-dimensional systolic array and stores results in a right subset of the plurality of memory elements on the right side of the rows of the two-dimensional systolic array;
   a column-accelerator mode wherein data flows from a right subset of the plurality of memory elements on a right side of the rows leftward toward a leftmost column of the two-dimensional systolic array in an activation process and data accumulates downward toward a bottom subset of the plurality of memory elements on a bottom side of the columns in an accumulation process;
   a column-CPU mode wherein each column of the two-dimensional systolic array includes a RISC-V pipeline core that processes data from a top row toward a bottom row of the two-dimensional systolic array and stores results in the bottom subset of the plurality of memory elements on the bottom side of the columns of the two-dimensional systolic array; and
   a row-accelerator mode wherein data flows from the bottom subset of the plurality of memory elements on a bottom side of the columns upward toward a topmost row of the two-dimensional systolic array in an activation process and data accumulates rightward toward the right subset of the plurality of memory elements on a right side of the rows in an accumulation process.

10. The electronic circuit of claim 9, further comprising a control circuit configured to cause the electronic circuit to cycle through the row-CPU mode, the column-accelerator mode, the column-CPU mode, and the row-accelerator mode continuously until all neural network layers of the electronic circuit have finished eliminating intermediate data transfer across the processing elements.

11. A method of performing deep neural network processing and computing processing in a two-dimensional systolic array of reconfigurable processing elements, the reconfigurable processing elements communicatively coupled with neighboring reconfigurable processing elements for bidirectional communications, the method comprising:
configuring the two-dimensional systolic array of reconfigurable processing elements into a row-central processing unit (row-CPU) mode wherein the two-dimensional systolic array is configured to perform standard computations on input data;
receiving input data by the two-dimensional systolic array configured into row-CPU mode;
performing standard computations on the input data by the two-dimensional systolic array;
saving results of the row-CPU computations in memory elements local to the two-dimensional systolic array;
configuring the two-dimensional systolic array of reconfigurable processing elements into a column-accelerator mode wherein the two-dimensional systolic array is configured to perform deep neural network processing on input data;
performing column-accelerator mode neural network computations starting from the results from the row-CPU mode computations in the local memory elements where the results were saved as input data by the two-dimensional systolic array configured into column-accelerator mode;
saving results of the column-accelerator mode neural network computations in memory elements local to the two-dimensional systolic array;
configuring the two-dimensional systolic array of reconfigurable processing elements into a column-central processing unit (column-CPU) mode wherein the two-dimensional systolic array is configured to perform standard computations on input data;
receiving input data by the two-dimensional systolic array configured into column-CPU mode;
performing standard computations on the input data by the two-dimensional systolic array;
saving results of the column-CPU computations in memory elements local to the two-dimensional systolic array;
configuring the two-dimensional systolic array of reconfigurable processing elements into a row-accelerator mode wherein the two-dimensional systolic array is configured to perform deep neural network processing on input data;
performing row-accelerator mode neural network computations starting from the results from the column-CPU mode computations in the local memory elements where the results were saved as input data by the two-dimensional systolic array configured into row-accelerator mode; and
saving results of the row-accelerator mode neural network computations in memory elements local to the two-dimensional systolic array.

12. The method of claim 11, further comprising:
determining if any neural network layers of the two-dimensional systolic array have any intermediate data transfer across cores remaining to be eliminated; and
while intermediate data transfer across cores remains to be eliminated, continuing cycling through operations of the method of claim 11 in a circular sequence from row-CPU mode operations, to column-accelerator mode operations, to column-CPU mode operations, and to row-accelerator mode operations.

13. The method of claim 11, further comprising causing data to flow in a direction during the row-accelerator mode neural network computations that is orthogonal to a direction data flows during the column-accelerator mode neural network computations.

14. The method of claim 11, wherein:
performing neural network computations comprises performing systolic dataflow with weight-stationary operations; and performing standard computations by the two-dimensional systolic array comprises performing computations by a sequence of Reduced Instruction Set Computer-Five (RISC-V) pipeline stages configured from the processing elements of the two-dimensional systolic array.

15. A method of performing deep neural network processing and computing processing in a two-dimensional systolic array of reconfigurable processing elements, the reconfigurable processing elements communicatively coupled with neighboring reconfigurable processing elements for bidirectional communications, the method comprising:
configuring the two-dimensional systolic array of reconfigurable processing elements into a row-central processing unit (row-CPU) mode wherein each row of the two-dimensional systolic array includes a RISC-V pipeline core;
performing computing processing of each RISC-V pipeline core row from a leftmost column toward a rightmost column of the two-dimensional systolic array;
storing results of the RISC-V pipeline core row processing in a right set of memory elements to the right of a rightmost column of the two-dimensional systolic array;
configuring the two-dimensional systolic array of reconfigurable processing elements into a column-accelerator mode wherein the reconfigurable processing elements are configured as deep neural network (DNN) processing elements;
performing column-accelerator mode activation by processing neural network data flowing from a right set of memory elements on a rightmost side of the rows of the two-dimensional systolic array leftward toward a leftmost column of the two-dimensional systolic array;
performing column-accelerator mode accumulation by processing neural network data flowing from a topmost row of the two-dimensional systolic array toward a bottom set of memory elements below a bottommost row of the two-dimensional systolic array;
storing results of the column-accelerator mode accumulation in the bottom set of memory elements below the bottommost row of the two-dimensional systolic array;
configuring the two-dimensional systolic array of reconfigurable processing elements into a column-central processing unit (column-CPU) mode wherein each column of the two-dimensional systolic array includes a RISC-V pipeline core;

performing computing processing of each RISC-V pipeline core column from a topmost row toward a bottommost row of the two-dimensional systolic array;

storing results of the RISC-V pipeline core column processing in the bottom set of memory elements below the bottommost row of the two-dimensional systolic array;

configuring the two-dimensional systolic array of reconfigurable processing elements into a row-accelerator mode wherein the reconfigurable processing elements are configured as DNN processing elements;

performing row-accelerator mode activation by processing neural network data flowing from the bottom set of memory elements below the bottommost row of the two-dimensional systolic array upward toward a topmost row of the two-dimensional systolic array;

performing row-accelerator mode accumulation by processing neural network data flowing from the leftmost column of the two-dimensional systolic array toward the right set of memory elements to the right of the rightmost column of the two-dimensional systolic array; and storing results of the row-accelerator mode accumulation in the right set of memory elements to the right of the rightmost column of the two-dimensional systolic array.

16. The method of claim 15, further comprising sending data stored in the right set of memory elements at a conclusion of a most recently completed row-accelerator mode accumulation process to corresponding register files of the respective RISC-V pipeline core rows and processing the sent data provided to the execution stage of the RISC-V pipeline core rows by the corresponding register files.

17. The method of claim 15, further comprising sending data stored in the bottom set of memory elements at a conclusion of a most recently completed column-accelerator mode accumulation process to corresponding register files of the respective RISC-V pipeline core columns and processing the sent data provided to the execution stage of the RISC-V pipeline core columns by the corresponding register files.

18. The method of claim 15, further comprising using data stored in the bottom set of memory elements at a conclusion of a most recently completed column-CPU mode computing process as input data to the respective row-accelerator mode columns.

19. The method of claim 15, further comprising using data stored in the right set of memory elements at a conclusion of a most recently completed row-CPU mode computing process as input data to the respective column-accelerator mode rows.

20. The method of claim 15, further comprising:
determining if any neural network layers of the two-dimensional systolic array have any intermediate data transfer across cores remaining to be eliminated; and
while intermediate data transfer across cores remains to be eliminated, continuing cycling through operations of the method of claim 15 in a circular sequence from row-CPU mode operations, to column-accelerator mode operations, to column-CPU mode operations, and to row-accelerator mode operations.

* * * * *